United States Patent
Hill et al.

(10) Patent No.: US 6,421,054 B1
(45) Date of Patent: Jul. 16, 2002

(54) METHODS AND APPARATUS FOR PERFORMING GRID FITTING AND HINTING OPERATIONS

(75) Inventors: William Hill, Carnation; Michael Duggan, Kirkland, both of WA (US); Leroy B. Keely, Jr., Portola Valley, CA (US); Gregory C. Hitchcock, Woodinville, WA (US); J. Turner Whitted, Pittsboro, NC (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/168,015

(22) Filed: Oct. 7, 1998

(51) Int. Cl.[7] .................................................. G09G 9/36

(52) U.S. Cl. .................... 345/469; 345/467; 345/468; 345/469.1; 345/470; 345/472

(58) Field of Search ................................ 345/467, 468, 345/469, 469.1, 470, 471, 472

(56) References Cited

U.S. PATENT DOCUMENTS

| | | | |
|---|---|---|---|
| 5,594,854 A | * | 1/1997 | Baldwin et al. ............ 395/141 |
| 5,684,510 A | * | 11/1997 | Brassell et al. ............ 345/143 |
| 5,710,880 A | * | 1/1998 | Howlett et al. ............ 395/168 |
| 5,821,913 A | * | 10/1998 | Mamiya ..................... 345/88 |
| 5,943,063 A | * | 8/1999 | Dowling .................... 345/471 |
| 6,088,041 A | * | 7/2000 | Ballard et al. ............. 345/467 |
| 6,104,375 A | * | 8/2000 | Lam ........................... 345/150 |

* cited by examiner

Primary Examiner—Matthew Luu
Assistant Examiner—Daniel J Chung
(74) Attorney, Agent, or Firm—Workman, Nydegger, Seeley

(57) ABSTRACT

Methods and apparatus for utilizing pixel sub-components which form a pixel element of an LCD display, e.g., as separate luminous intensity elements, are described. Each pixel of a color LCD display is comprised of three non-overlapping red, green and blue rectangular pixel sub-elements or sub-components. The invention takes advantage of the ability to control individual RGB pixel sub-elements to effectively increase a screen's resolution in the dimension perpendicular to the dimension in which the screen is striped, e.g., the RGB pixel sub-elements are arranged lengthwise. In order to utilize the effective resolution which can be obtained by treating RGB pixel sub-components separately, scaling or super sampling of digital representations of fonts is performed in one dimension at a rate that is greater than the scaling or sampling performed in the other dimension. In some embodiments where weighting is used in determining RGB pixel values, e.g., during scan conversion, the super sampling is a function of the weighting. During a scan conversion operation, RGB pixel sub-component values are independently determined from different portions of a scaled image. The scan conversion process may involve use of different weights for each color component. Processing to compensate for color distortions, e.g., color fringing, introduced by treating each pixel sub-component as an independent element is described. For horizontally flowing text applications, screens with vertical as opposed to horizontal striping are preferred.

43 Claims, 23 Drawing Sheets

METHODS AND APPARATUS FOR PERFORMING GRID FITTING AND HINTING OPERATIONS

FIELD OF THE INVENTION

The present invention relates to methods and apparatus for displaying images, and more particularly, to display methods and apparatus which utilize multiple displaced portions of an output device, e.g., liquid crystal display, to represent a single pixel of an image.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by the human eye.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue resulting in repeating sequences of phosphor dots which, when excited by a beam of electrons, will generate the colors red, green and blue.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

FIG. 1 illustrates a known portable computer 100, which comprises a housing 101, a disk drive 105, keyboard 104 and a flat panel display 102.

Portable personal computers 100 tend to use liquid crystal displays (LCD) or other flat panel display devices 102, as opposed to CRT displays. This is because flat panel displays tend to be small and light weight as compared to CRT displays. In addition, flat panel displays tend to consume less power than comparably sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Over the years, most image processing techniques, including the generation and display of fonts, e.g., sets of characters, on computer screens, have been developed and optimized for display on CRT display devices.

Unfortunately, existing text display routines fail to take into consideration the unique physical characteristics of flat panel display devices. These physical characteristics differ considerably from the characteristics of CRT devices particularly in regard to the physical characteristics of the RGB color light sources.

Color LCD displays are exemplary of display devices which utilize multiple distinctly addressable elements, referred to herein as pixel sub-elements or pixel sub-components, to represent each pixel of an image being displayed. Normally, each pixel on a color LCD display is represented by a single pixel element which usually comprises three non-square elements, i.e., red, green and blue (RGB) pixel sub-components. Thus, a set of RGB pixel sub-components together make up a single pixel element. LCD displays of the known type comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction.

FIG. 2A illustrates a known LCD screen 200 comprising a plurality of rows (R1–R12) and columns (C1–C16) which may be used as the display 102. Each row/column intersection forms a square which represents one pixel element. FIG. 2B illustrates the upper left hand portion of the known display 200 in greater detail.

Note in FIG. 2B how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width pixel sub-components 206, 207, 208 form a single pixel element.

As illustrated in FIG. 2A, one known arrangement of RGB pixel sub-components 206, 207, 208 form what appear to be vertical color stripes down the display 200. Accordingly, the arrangement of ⅓ width color sub-components 206, 207, 208, in the known manner illustrated in FIGS. 2A and 2B, is sometimes called "vertical striping".

While only 12 rows and 16 columns are shown in FIG. 2A for purposes of illustration, common column×row ratios include, e.g., 640×480, 800×600, and 1024×768. Note that known display devices normally involve the display being arranged in landscape fashion, i.e., with the monitor being wider than it is high as illustrated in FIG. 2A, and with stripes running in the vertical direction.

LCDs are manufactured with pixel sub-components arranged in several additional patterns including, e.g., zig-zags and a delta pattern common in camcorder view finders. While features of the present invention can be used with such pixel sub-component arrangements, since the RGB striping configuration is more common, the exemplary embodiments of the present invention will be explained in the context of using RGB striped displays.

Traditionally, each set of pixel sub-components for a pixel element is treated as a single pixel unit. Accordingly, in known systems luminous intensity values for all the pixel sub-components of a pixel element are generated from the same portion of an image. Consider for example, the image represented by the grid 220 illustrated in FIG. 2C. In FIG. 2C each square represents an area of an image which is to be represented by a single pixel element, e.g., a red, green and blue pixel sub-component of the corresponding square of the grid 230. In FIG. 2C a shaded circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in known systems, the RGB pixel sub-components are generally used as a group to generate a single colored pixel corresponding to a single sample of the image to be represented.

The light from each pixel sub-component group effectively adds together to create the effect of a single color whose hue, saturation, and intensity depend on the value of each of the three pixel sub-components. Say, for example, each pixel sub-component has a potential intensity of between 0 and 255. If all three pixel sub-components are given 255 intensity, the eye perceives the pixel as being white. However, if all three pixel sub-components are given a value turning off each of the three pixel sub-components, the eye perceives a black pixel. By varying the respective intensities of each pixel sub-component, it is possible to generate millions of colors in between these two extremes.

Since, in the known system a single sample is mapped to a triple of pixel sub-components which are each ⅓ of a pixel in width, spatial displacement of the left and right pixel sub-components occurs since the centers of these elements are ⅓ from the center of the sample.

Consider for example that an image to be represented was a red cube with green and blue components equal to zero. As a result of the displacement between the sample and green image sub-component, when displayed on an LCD display of the type illustrated in FIG. 2A, the apparent position of the cube on the display will be shifted ⅓ of a pixel to the left of its actual position. Similarly, a blue cube would appear to be displaced ⅓ of a pixel to the right. Thus, known imaging techniques used with LCD screens can result in undesirable image displacement errors.

Text characters represent one type of image which is particularly difficult to accurately display given typical flat panel display resolutions of 72 or 96 dots (pixels) per inch (dpi). Such display resolutions are far lower than the 600 dpi supported by most printers and the even higher resolutions found in most commercially printed text such as books and magazines.

Because of the relatively low display resolution of most video display devices, not enough pixels are available to draw smooth character shapes, especially at common text sizes of 10, 12, and 14 point type. At such common text rendering sizes, gradations between different sizes and weights, e.g., the thickness, of the same typeface, are far coarser than their print equivalent.

The relatively coarse size of standard pixels tends to create aliasing effects which give displayed type characters jagged edges. For example, the coarse size of pixels tends to result in the squaring off of serifs, the short lines or ornaments at the ends, e.g., bottom, of strokes which form a typeface character. This makes it difficult to accurately display many highly readable or ornamental typefaces which tend to use serifs extensively.

Such problems are particularly noticeable in the stems, e.g., thin vertical portions, of characters. Because pixels are the minimum display unit of conventional monitors, it is not possible to display stems of characters using conventional techniques with less than one pixel stem weight. Furthermore, stem weight can only be increased a pixel at a time. Thus, stem weights leap from one to two pixels wide. Often one pixel wide character stems are too light, while two pixel wide character stems are too bold. Since creating a boldface version of a typeface on a display screen for small characters involves going from a stem weight of one pixel to two pixels, the difference in weight between the two is 100%. In print, bold might typically be only 20 or 30 percent heavier than its equivalent regular or Roman face. Generally, this "one pixel, two pixel" problem has been treated as an inherent characteristic of display devices which must simply be accepted.

Prior work in the field of displaying characters has focused, in part, on the development of anti-aliasing technologies designed to improve the display of characters on CRT displays. A commonly used anti-aliasing technique involves using shades of gray for pixels which include edges of the character. In effect, this smudges shapes, reducing spatial frequency of the edges but better approximating the intended character shapes. While known anti-aliasing techniques can significantly improve the quality of characters displayed on a CRT display device, many of these techniques are ineffective when applied to LCD display devices which differ considerably from CRT displays in terms of pixel sub-component arrangement.

While anti-aliasing techniques have helped the aliasing problem associated with displaying relatively low resolution representations of text, at least on CRT displays, the problem of pixel size and the inability to accurately display character stem widths have, prior to the present invention, been considered a fixed characteristic of display devices which must be tolerated.

In view of the above, it is apparent that there is a need for new and improved methods and apparatus for displaying text on flat panel display devices. It is desirable that at least some of the new methods be suitable for use with existing display device and computers. It is also desirable that at least some methods and apparatus be directed to improving the quality of displayed text on new computers using, e.g., new display devices and/or new methods of displaying text.

While the display of text, which is a special case of graphics, is of major concern in many computer applications, there is also a need for improved methods and apparatus for displaying other graphics, geometric shapes, e.g., circles, squares, etc., and captured images such as photographs, accurately and clearly.

SUMMARY OF THE PRESENT INVENTION

The present invention is directed to methods and apparatus for displaying images utilizing multiple distinct portions of an output device, e.g., an LCD display, to represent a single pixel of an image.

The inventors of the present application recognize the well-known principle that human eyes are much more sensitive to edges of luminance, where light intensity changes, than to edges of chrominance, where color intensity changes. This is why it is very difficult to read red text on a green background, for example. They also recognize the well-known principle that the eye is not equally sensitive to the colors of red, green and blue. In fact, of 100 percent luminous intensity in a fully white pixel the red pixel sub-component contributes approximately 30% to the overall perceived luminance, green 60% and blue 10%.

Various features of the present invention are directed to utilizing the individual pixel sub-components of a display as independent luminous intensity sources thereby increasing the effective resolution of a display by as much as a factor of 3 in the dimension perpendicular to the direction of the RGB striping. This allows for a significant improvement in visible resolution.

While the methods of the present invention may result in some degradation in chrominance quality as compared to known display techniques, as discussed above the human eye is more sensitive to edges of luminance than of chrominance. Accordingly, the present invention can provide significant improvements in the quality of images, compared to known rendering techniques, even when taking into consideration the negative impact the techniques of the present invention may have on color quality.

As discussed above, known monitors tend to use vertical striping. Because character stems occur in the vertical direction the ability to accurately control the thickness of vertical lines when rendering horizontally flowing text tends to be more important than the ability to control the thickness of horizontal lines. With this in mind, it was concluded that, at least for text applications, it is often more desirable to have a monitor's maximum resolution in the horizontal, as opposed to vertical direction. Accordingly, various display devices implemented in accordance with the present invention utilize vertical, as opposed to horizontal, RGB striping. This provides such monitors, when used in accordance with the present invention, greater resolution in the horizontal direction than in the vertical direction. The present invention can however be applied similarly to monitors with horizontal RGB striping resulting in improved resolution in the vertical direction as compared to conventional image rendering techniques.

In addition to new display devices which are suitable for use when treating pixel sub-components as independent luminous intensity sources, the present invention is directed to new and improved text, graphics and image rendering techniques which facilitate pixel sub-component use in accordance with the present invention.

The display of images, including text, involves several steps including, e.g., image scaling, hinting and scan conversion.

An image scaling technique of the present invention involves scaling geometric representations of text, in the dimension perpendicular to the direction of RGB striping, at a rate that is greater than the rate of scaling in the direction of RGB striping. Such a non-uniform scaling technique allows subsequent processing operations to take full advantage of the effective increase in resolution obtained by treating pixel sub-components as individual luminous intensity sources. Scaling in the direction perpendicular to the striping may also be made a function of one or more weighting factors used in a subsequent scan conversion operation. Accordingly scaling in the direction perpendicular to the striping may be many times, e.g., 10 times, the scaling performed in the direction of the striping.

In addition to new scaling methods, the present invention is directed to new methods of performing hinting operations. These methods take into consideration pixel sub-component boundaries within an image, in addition to pixel boundaries considered in known hinting operations. Some hinting operations performed for use with display devices with vertical striping involve as a step, aligning characters along pixel sub-component boundaries so that the character stem borders on, or is within a red, blue or green pixel sub-component, as opposed to always between blue and red pixel sub-components as occurs at the whole pixel edge.

Other hinting operations may be performed for use with display devices with horizontal striping. Such hinting operations involve as a step, aligning character bases along pixel sub-component boundaries so that the character bases border are red or blue pixel sub-components, as opposed to a whole pixel edge.

In accordance with the present invention, as part of a hinting operation the width of vertical and/or horizontal lines within an image may be adjusted as a function of pixel sub-component boundaries. This allows for the hinting processes to perform finer adjustments when distorting an images shape than in known systems where hinting is performed as a function of the location of whole pixel boundaries (edges) as opposed to pixel sub-component boundaries.

Scan conversion normally follows hinting. Scan conversion is the process by which geometric representations of images are converted into bitmaps. Scan conversion operations of the present invention involve mapping different portions of an image into different pixel sub-components. This differs significantly from known scan conversion techniques where the same portion of an image is used to determine the luminous intensity values to be used with each of the three pixel sub-components which represent a pixel.

As a result of treating RGB pixel sub-components as independent luminous intensity sources, color fringing effects may be encountered. One feature of the present invention is directed to processing bitmapped images to detect undesirable color fringing effects. Another feature of the invention is directed to performing color processing operations on bitmapped images to lessen or compensate for undesirable color fringing effects.

Numerous additional features, embodiments, and advantages of the methods and apparatus of the present invention are set forth in the detailed description which follows.

BRIEF DESCRIPTION OF THE DRAWINGS

FIG. 16 illustrates how the character of FIG. 15 would be illustrated using known techniques.

FIGS. 17–20 illustrate different ways of illustrating the character shown in FIG. 15 in accordance with various text rendering techniques of the present invention.

DETAILED DESCRIPTION

As discussed above, the present invention is directed to methods and apparatus for displaying images, e.g., text and/or graphics, on display devices which are capable of utilizing multiple distinct sections of an output device, e.g., the pixel sub-components of a liquid crystal display, to represent a single pixel of an image.

Various methods of the present invention are directed to using each pixel sub-component as a separate independent luminous intensity source as opposed to treating the set of RGB pixel sub-components which comprise a pixel as a single luminous intensity unit. This allows for a display device with RGB horizontal or vertical striping to be treated as having an effective resolution in the dimension perpendicular to the direction of the striping that is up to 3 times greater than in the dimension of the striping. Various apparatus of the present invention are directed to display devices and control apparatus which take advantage of the ability to individually control sub-pixel components.

Figure 4:
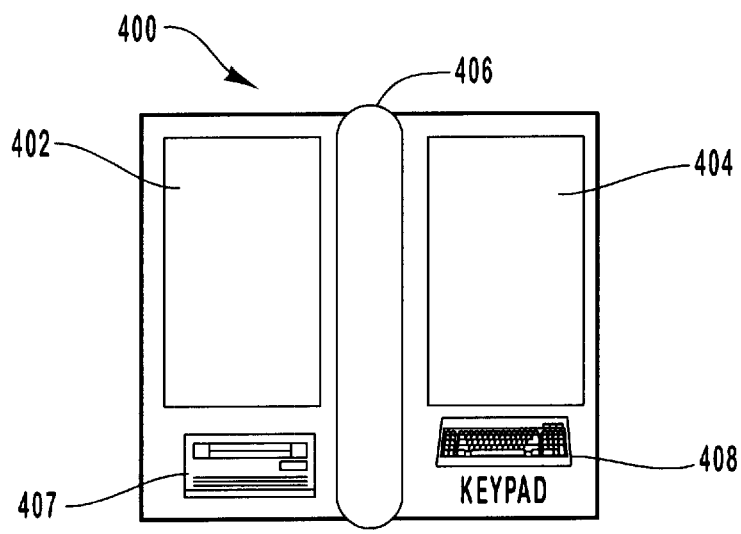
FIG. 4 illustrates an electronic book with flat panel displays arranged in a portrait arrangement in accordance with one embodiment of the present invention.

FIG. 4 illustrates a computerized electronic book device 400 implemented in accordance with one embodiment of the present invention. As illustrated in FIG. 4, the electronic book 400 comprises first and second display screens 402, 404 for displaying odd and even pages of a book, respectively. The electronic book 400 further comprises an input device, e.g., keypad or keyboard 408 and a data storage device, e.g., CD disk drive 407. A hinge 406 is provided so that the electronic book 400 can be folded protecting the displays 402, 404 when not in use. An internal battery may be used to power the electronic book 400. Similarly, other portable computer embodiments of the present invention may be powered by batteries.

Figure 5:
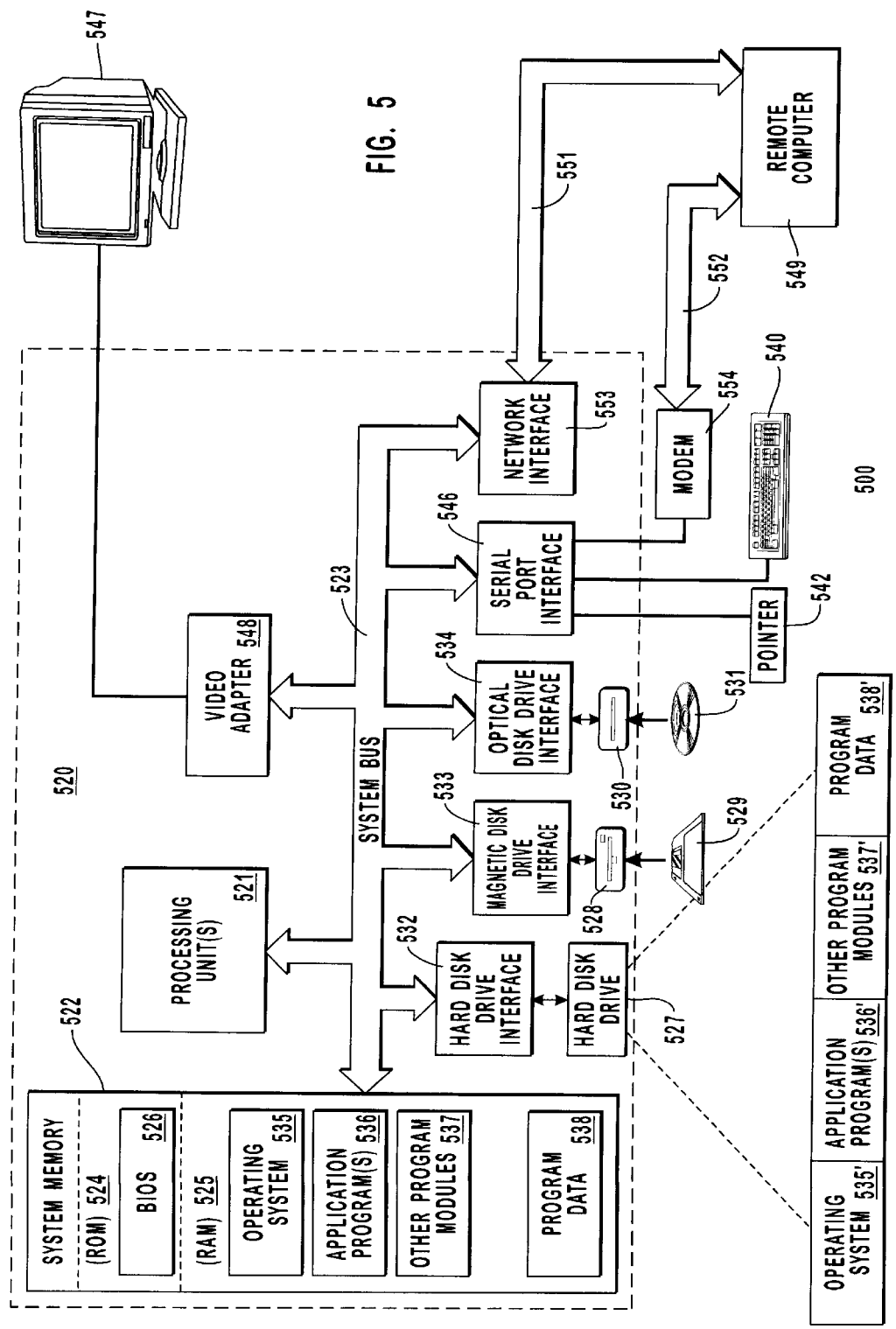
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules, being executed by a computer device such as the electronic book 400 or a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device, e.g., personal computer 520. The personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory 522 may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 527, magnetic disk 529, (magneto) optical disk 531, ROM 524 or RAM 525, such as an operating system 535, one or more application programs 536, other program modules 537, and/or program data 538 for example. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus 523. However, input devices may be connected by other interfaces, such as a parallel port, a game port or a universal serial bus (USB). A monitor 547 or other type of display device may also be connected to the system bus 523 via an interface, such as a video adapter 548 for example.

The apparatus 500 may be used to implement the book 400 through the addition of a second display device. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7A:
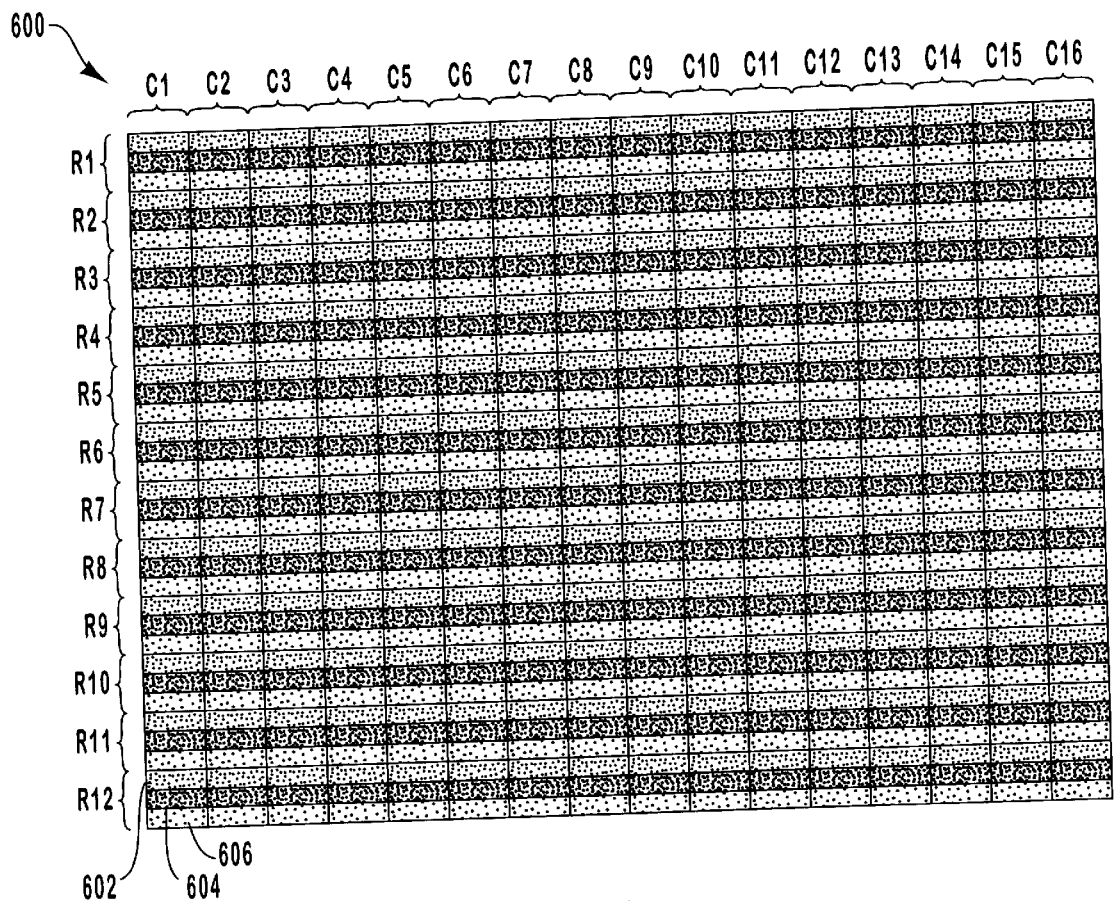
FIG. 7A illustrates a color flat panel display screen implemented in accordance with the present invention.

FIG. 7A illustrates a display device 600 implemented in accordance with an embodiment of the present invention. The display device 600 is suitable for use in, e.g., portable computers or other systems where flat panel displays are desired. The display device 600 may be implemented as an LCD display. In one embodiment the display and control logic of the known computer 100 are replaced by the display device 600 and display control logic, e.g., routines, of the present invention to provide a portable computer with horizontal RGB striping and pixel sub-components which are used to represent different portions of an image.

As illustrated, the display device 600 includes 16 columns of pixel elements C1–C16 and 12 rows of pixel elements R1–R12 for a display having 16×12 pixels. The display 600 is arranged to be wider than it is tall as is the case with most computer monitors. While the display 600 is limited to 16×12 pixels for purposes of illustration in the patent, it is to be understood that monitors of the type illustrated in FIG. 7A can have any number of vertical and horizontal pixel elements allowing for displays having, e.g., 640×480, 800× 600, 1024×768 and 1280×1024 ratios of horizontal to vertical pixel elements as well as ratios resulting in square displays.

Each pixel element of the display 600 includes 3 sub-components, a red pixel sub-component 602, a green pixel sub-component 604, and a blue pixel sub-component 606. In the FIG. 7A embodiment, each pixel sub-component 602, 604, 606 has a height that is equal to, or approximately equal to, ⅓ the height of a pixel and a width equal to, or approximately equal to, the width of the pixel.

In the monitor 600, the RGB pixel sub-components are arranged to form horizontal stripes. This is in contrast to the vertical striping arrangement used in the previously discussed monitor 200. The monitor 600 may be used, e.g., in particular graphics applications where, because of the application, it is desirable to have a greater vertical, as opposed to horizontal resolution.

Figure 7B:
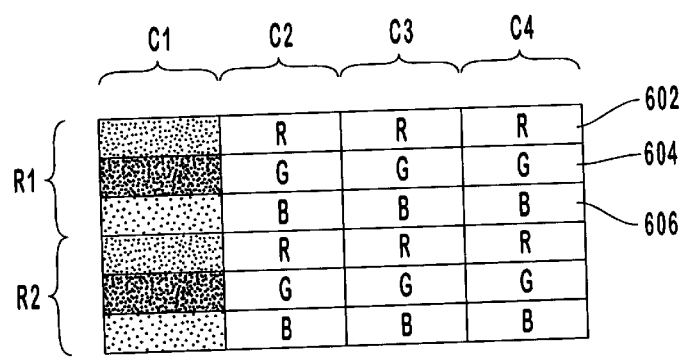
FIG. 7B illustrates a portion of the display screen of FIG. 7A.

FIG. 7B illustrates the upper left hand portion of the display 600 in greater detail. In FIG. 7B, the horizontal RGB striping pattern is clearly visible with the letters R, G and B being used to indicate correspondingly colored pixel sub-components.

Figure 7C:
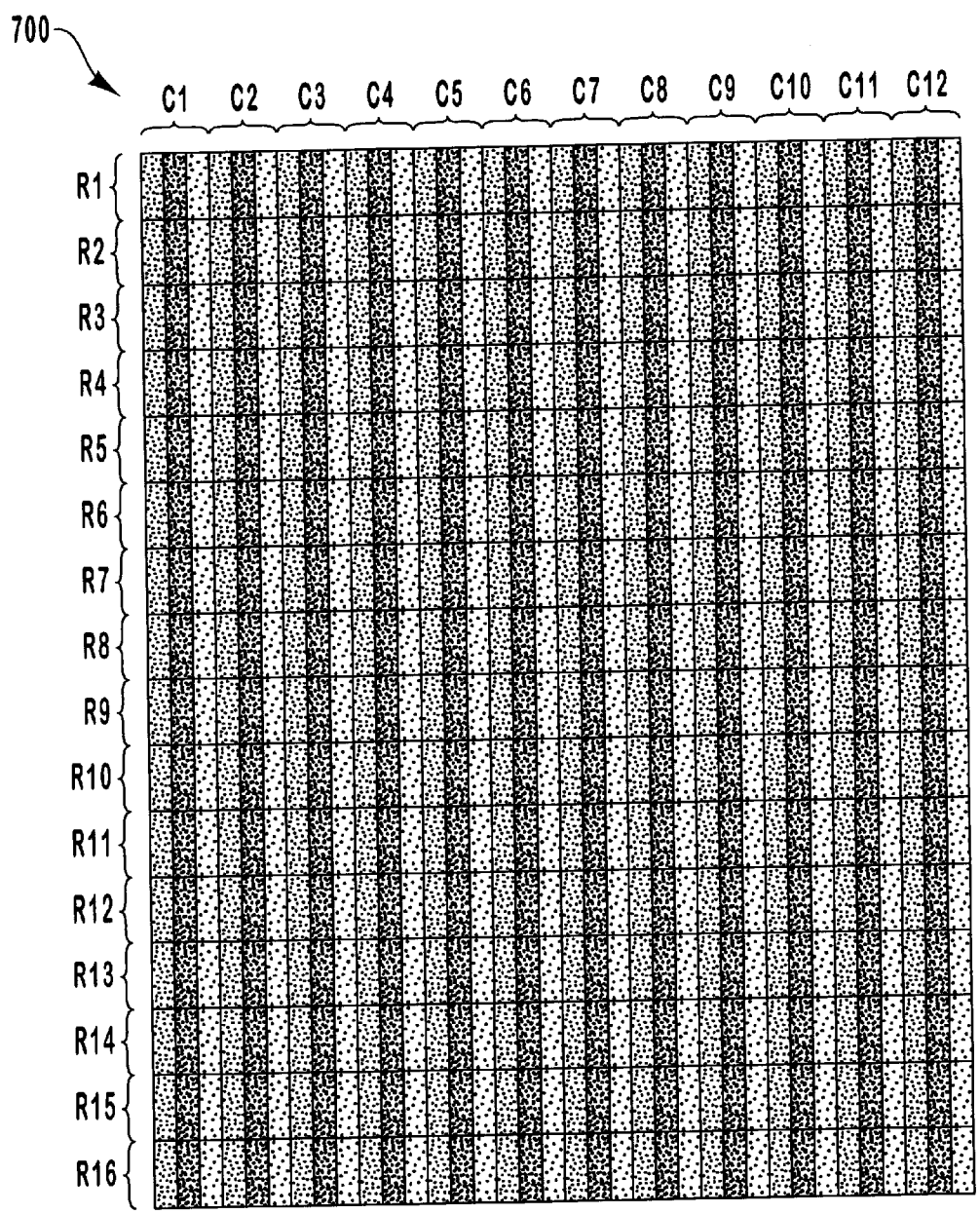
FIG. 7C illustrates a display screen implemented in accordance with another embodiment of the present invention.

FIG. 7C illustrates another display device 700 implemented in accordance with the present invention. FIG. 7C illustrates the use of vertical RGB striping in a display device, e.g., an LCD display, having more vertical pixel elements than horizontal pixel elements. While a 12×16 display is illustrated, it is to be understood that the display 700 may be implemented with any number of columns/rows of pixels, including column/row ratios which result in square displays.

The display device 700 is well suited where a portrait type display of horizontally flowing text is desired. A display device of the type illustrated in FIG. 7C may be used as the displays 402, 404 of the electronic book 400. As with the monitor of FIG. 6, each pixel element is comprised of 3 pixel sub-components, i.e., an R, G, and B pixel sub-component.

While the display 7A may be desirable for certain graphics applications, the accurate representation of character stems, the relatively long thin vertical portions of characters, is far more important than the representation of serifs in generating high quality characters. Vertical striping has the distinct advantage, when used according to the present invention, of allowing for stems which can be adjusted in width ⅓ of a pixel at a time. Thus, using a display device such as the device 200 or 700 with a vertical striping arrangement in conjunction with the display methods of the present invention, can provide higher quality text than the known horizontal striping arrangement which limits stem width adjustments to 1 pixel increments.

Another advantage of vertical striping is that it allows for adjustments in character spacing in increments of less than a pixel size in width, e.g., ⅓ of a pixel size increments. Character spacing is a text characteristic which is important to legibility. Thus, using vertical striping can produce improved text spacing as well as finer stem weights.

Figure 8:
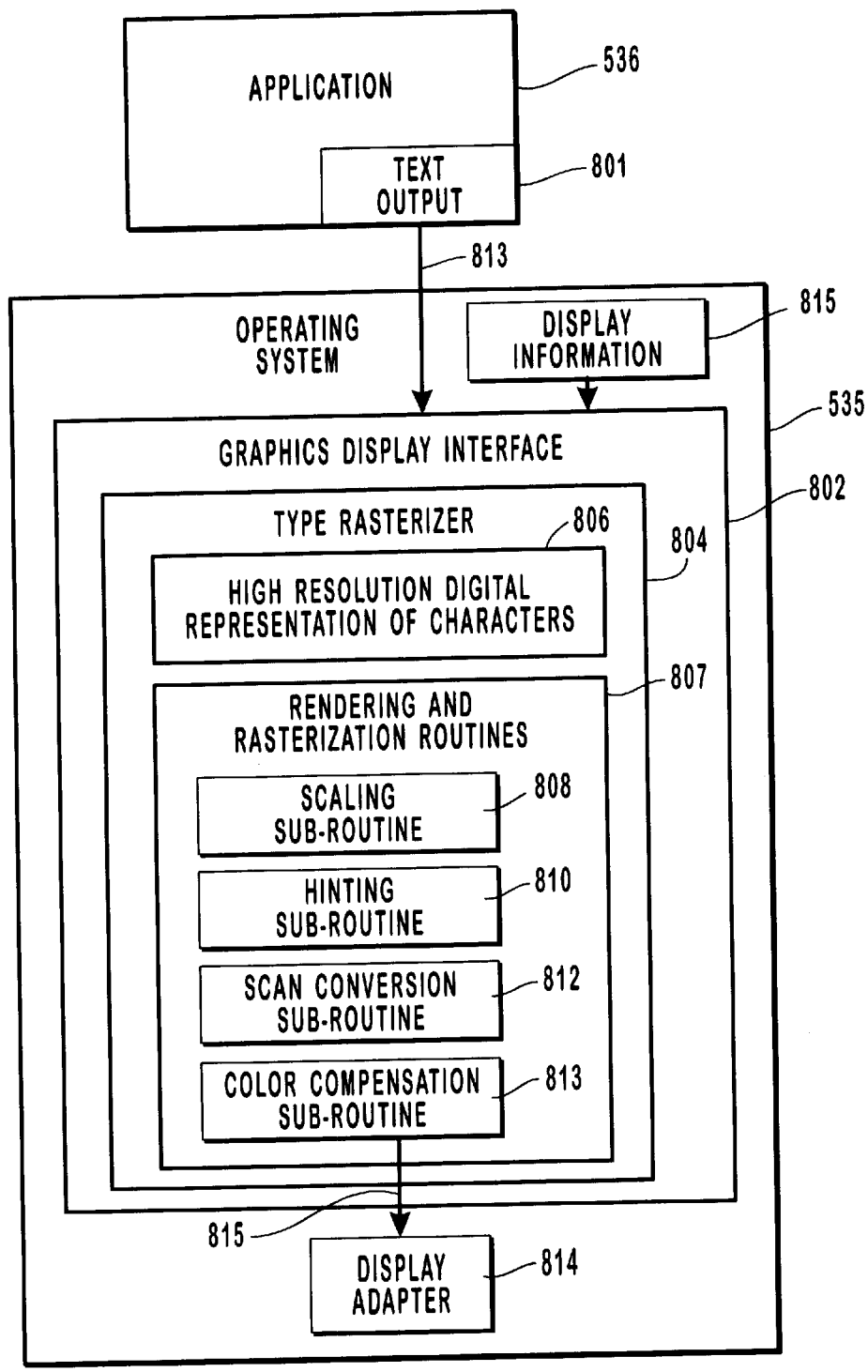
FIG. 8 illustrates various elements, e.g., routines, included in the memory of the computer system of FIG. 5, used for rendering text images on the computer system's display.

FIG. 8 illustrates various elements, e.g., routines, included in the memory of the computer system of FIG. 5, used to render text images on the computer system's display in accordance with the present invention.

As illustrated, the application routine 536, which may be, e.g., a word processor application, includes a text output sub-component 801. The text output sub-component 801 is responsible for outputting text information, as represented by arrow 813, to the operating system 535 for rendering on the display device 547. The text information includes, e.g., information identifying the characters to be rendered, the font to be used during rendering, and the point size at which the characters are to be rendered.

The operating system 535 includes various components responsible for controlling the display of text on the display device 547. These components include display information 815, a display adapter 814, and a graphics display interface 802. The display information 815 includes, e.g., information on scaling to be applied during rendering and/or foreground/ background color information. The display adapter receives bitmap images from the graphics display interface 802 and generates video signals which are supplied to video adapter 548 for optical presentation by the display 547. The arrow 815 represents passing of the bitmap images from the graphics display interface 802 to the display adapter 814.

The graphics display interface 802 includes routines for processing graphics as well as text. Element 804 is a type rasterizer used to process text. The type rasterizer 804 is responsible for processing the text information obtained from the application 536 and generating a bitmap representation therefrom. The type rasterizer 804 includes character data 806 and rendering and rasterization routines 807.

The character data 806 may include, e.g., vector graphics, lines, points and curves, which provide a high resolution digital representation of one or more sets of characters.

Figure 3:
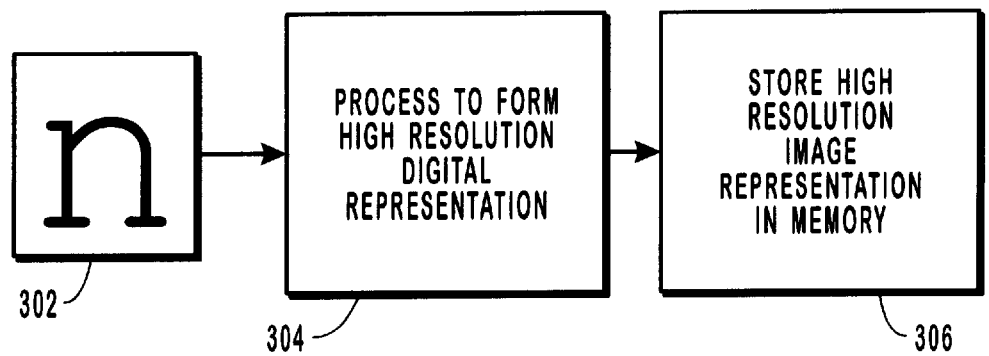
FIG. 3 illustrates known steps involved in preparing and storing character information for use in the subsequent generation and display of text.

As illustrated in FIG. 3, it is known to process text characters 302 to generate high resolution digital representations thereof, such as the data 806, which can be stored in memory for use during text generation. Accordingly, the generation 304 and storage 306 of data 806, will not be discussed herein in any detail.

The rendering and rasterization routines 807 include a scaling sub-routine 808, a hinting sub-routine 810, a scan conversion sub-routine 812 and a color compensation sub-routine 813. While performing scaling, hinting and scan conversion operations to render text images is common place, the routines and sub-routines of the present invention differ from known routines in that they take into consideration, utilize, or treat a screen's RGB pixel sub-components as separate luminous intensity entities which can be used to represent different portions of an image to be rendered. The color compensation sub-routine 813 is responsible for performing color compensation adjustments on the bitmap image created by the scan conversion sub-routine 812 to compensate for undesirable color fringing effects that may result from treating each of the three color sub-components of a pixel as separate luminous intensity elements. The operations performed by each of the sub-routines 808, 810, 812, and 813 of the present invention will be explained in detail below.

Figure 9:
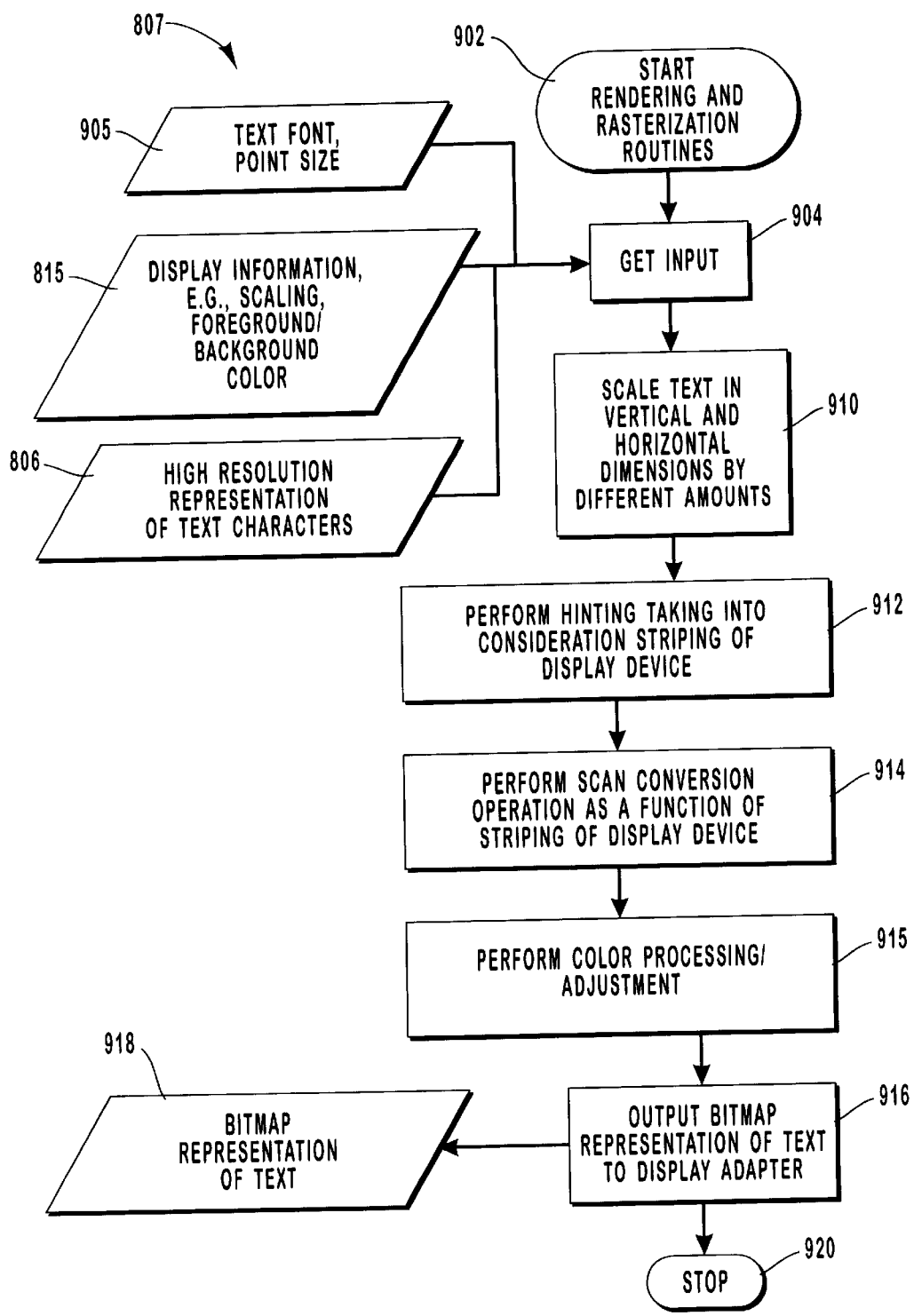
FIG. 9 illustrates a method of rendering text for display in accordance with one embodiment of the present invention.

FIG. 9 illustrates the rendering and rasterization routines 807 used for rendering text for display in accordance with the present invention. As illustrated, the routines 807 begin in step 902 wherein the routines are executed, e.g., under control of the operating system 535, in response to the receipt of text information from the application 536. In step 904 input is received by text rendering and rasterization routines 807. The input includes text, font, and point size information 905 obtained from the application 536. In addition, the input includes scaling information and/or foreground/background color information and pixel size information 815 obtained, e.g., from monitor settings stored in memory by the operating system. The input also includes the data 806 which includes a high resolution representation, e.g., in the form of lines, points and/or curves, of the text characters to be displayed.

With the input received in step 904, operation proceeds to step 910 wherein the scaling subroutine 808 is used to perform a scaling operation. In accordance with the present invention non-square scaling is performed as a function of the direction and/or number of pixel sub-components included in each pixel element. In particular, the high resolution character data 806, e.g., the line and point representation of characters to be displayed as specified by the received text and font information, is scaled in the direction perpendicular to the striping at a greater rate than in the direction of the striping. This allows for subsequent image processing operations to take advantage of the higher degree of resolution that can be achieved by using individual pixel sub-components as independent luminous intensity sources in accordance with the present invention.

Thus, when displays of the type illustrated in FIG. 7A are used as the device upon which data is to be displayed, scaling is performed in the vertical direction at a rate that is greater than that performed in the horizontal direction. When screens with vertical striping, e.g., screens illustrated in FIGS. 2 and 7C, are used, scaling is performed in the horizontal direction at a rate that is greater than that performed in the vertical direction.

The difference in scaling between the vertical and horizontal image directions can vary depending on the display used and the subsequent scan conversion and hinting processes to be performed. Display information including scaling information obtained in step 904 is used in step 910 to determine the scaling to be performed in a given embodiment.

In various embodiments of the present invention, scaling is performed in the direction perpendicular to the striping at a rate which is unrelated to the number of pixel sub-components which form each pixel. For example, in one embodiment where RGB pixel sub-components are used to form each pixel, scaling is performed in the direction perpendicular to the striping at a rate 20 times the rate at which scaling is performed in the direction of the striping. In most cases, the scaling of characters or images is, but need not be, performed in the direction perpendicular to the striping at a rate which allows further dividing the red, green and blue stripes in proportion to their luminous intensity contributions.

Figure 10A:
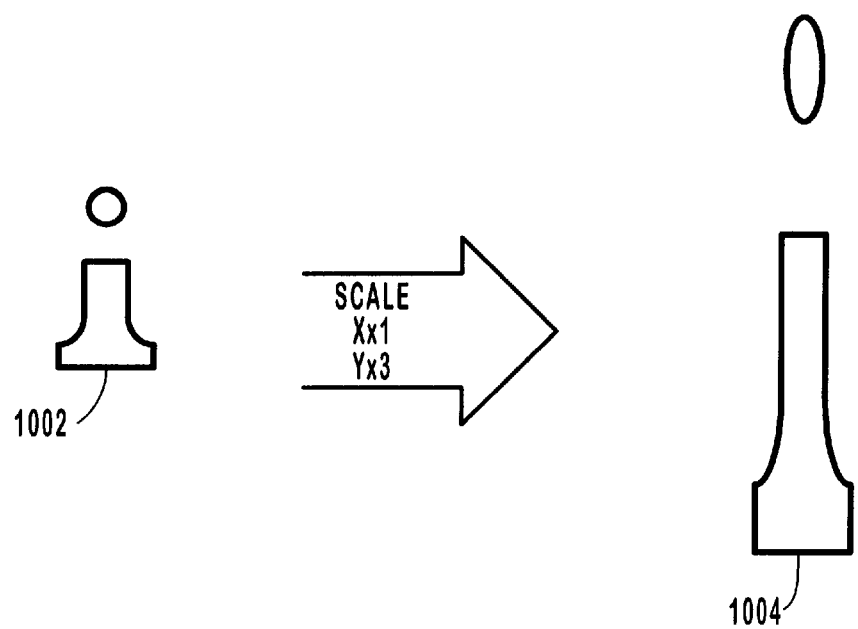
FIGS. 10A and 10B illustrate scaling operations performed in accordance with various exemplary embodiments of the present invention.

FIG. 10A illustrates a scaling operation performed on a high resolution representation of the letter i 1002 in anticipation of the display of the letter on a monitor with horizontal striping such as the one illustrated in FIG. 7A. Note that in this example scaling in the horizontal (x) direction is applied at a rate of x1 while scaling in the vertical (Y) direction is applied at a rate of x3. This results in a scaled character 1004 that is 3 times taller but just as wide as the original character 1002.

Figure 1:
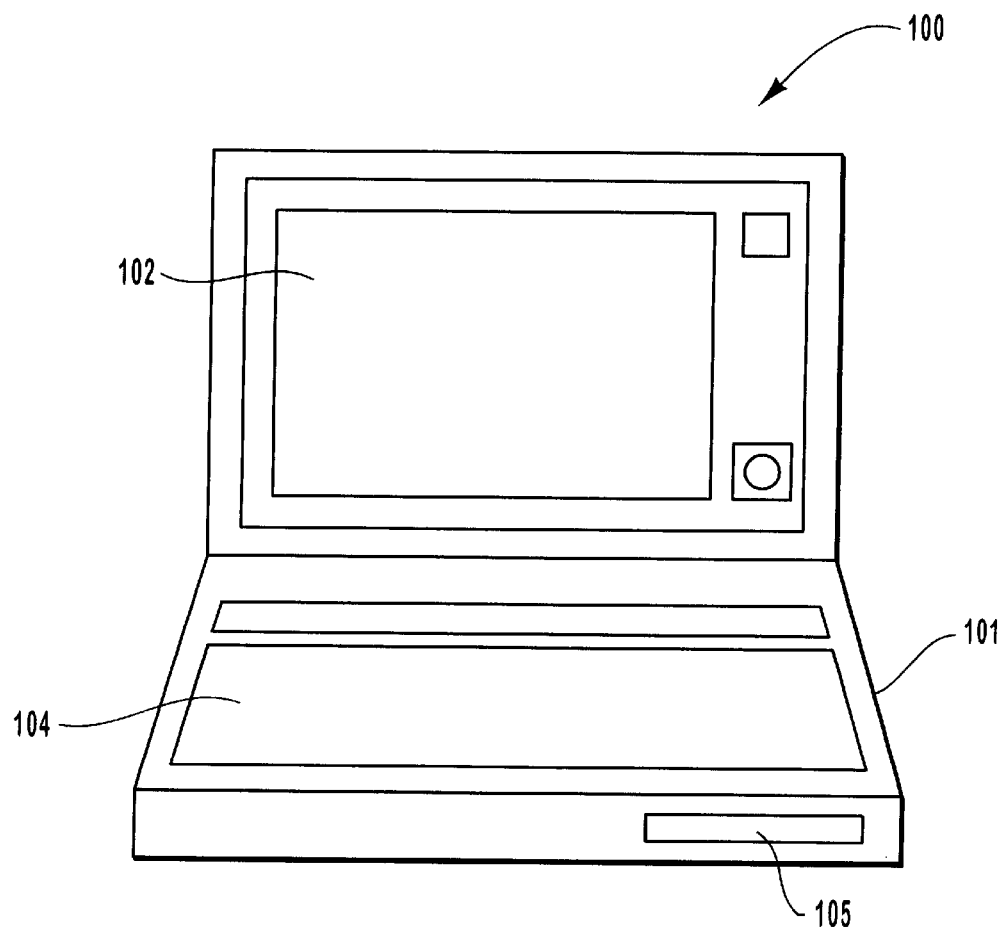
FIG. 1 is a diagram of a known portable computer.
Figure 2A:
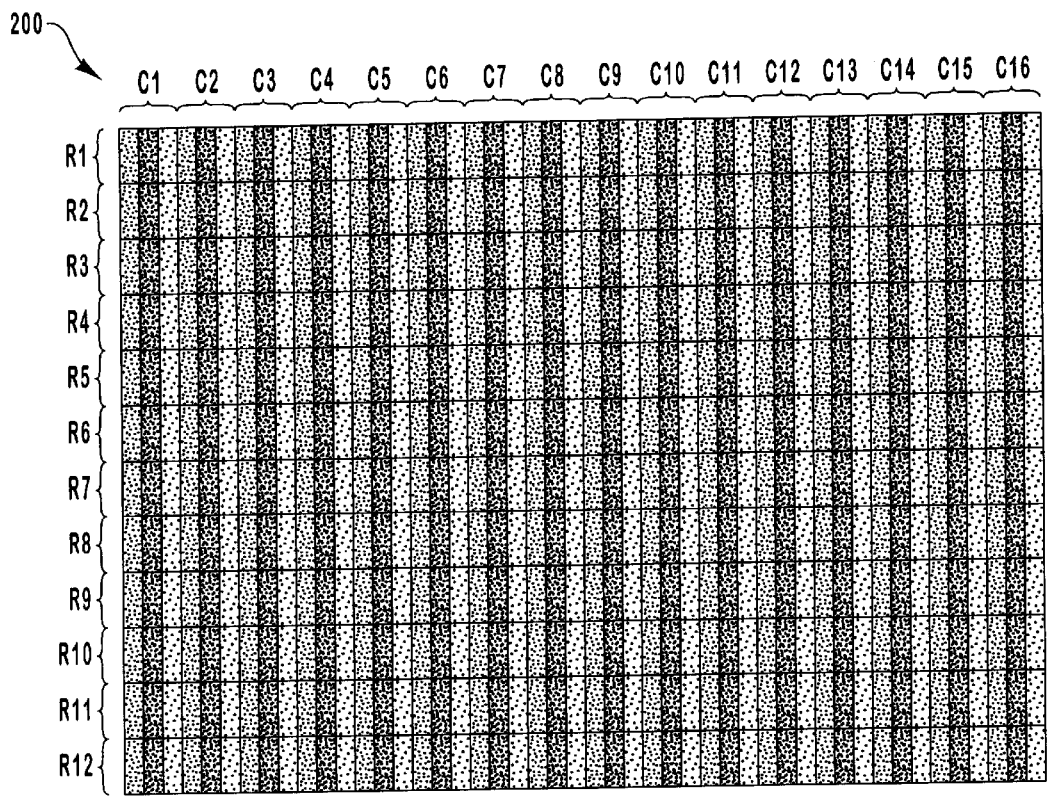
FIG. 2A illustrates a known LCD screen.
Figure 2B:
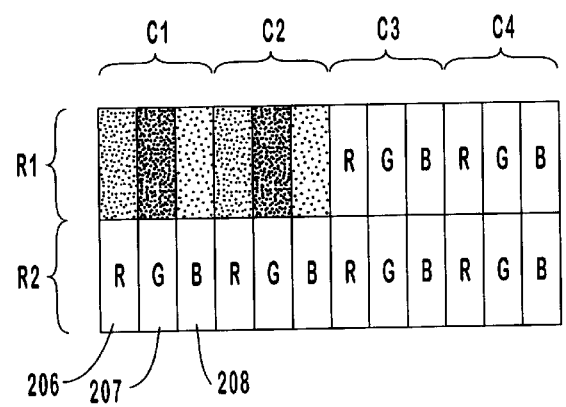
FIG. 2B illustrates a portion of the known screen illustrated in FIG. 2A in greater detail than the FIG. 2A illustration.
Figure 10B:
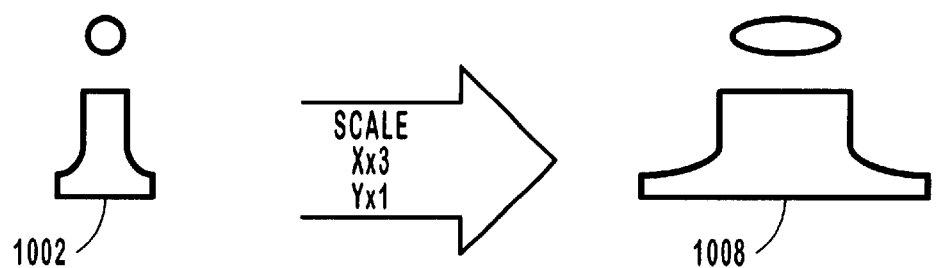

FIG. 10B illustrates a scaling operation performed on a high resolution representation of the letter i 1002 in anticipation of the display of the letter on a monitor with vertical striping such as the one illustrated in FIGS. 2A and 7C. Note that in this example scaling in the horizontal (X) direction is applied at a rate of x3 while scaling in the vertical (Y) direction is applied at a rate of x1. This results in a scaled character 1008 that is just as tall as the original character 1002 but three times wider.

Scaling by other amounts is possible. For example, in cases where a weighted scan conversion operation is to be used in determining luminous intensity values for pixel sub-components as part of a subsequent scan conversion operation, scaling is performed as a function of the RGB striping and weighting used. In one exemplary embodiment scaling in the direction perpendicular to the RGB striping is performed at a rate equal to the sum of the integer weights used during the scan conversion operation. In one particular embodiment, this results in scaling in the direction perpendicular to the striping at a rate of 10× while scaling is performed at a rate of 1× in the direction parallel to the striping.

Referring once again to FIG. 9, once the scaling operation is completed in step 910, operation proceeds to step 912 in which hinting of the scaled image is performed, e.g., by executing the hinting sub-routine 810. The term grid-fitting is sometimes used to describe the hinting process.

Figure 11A:
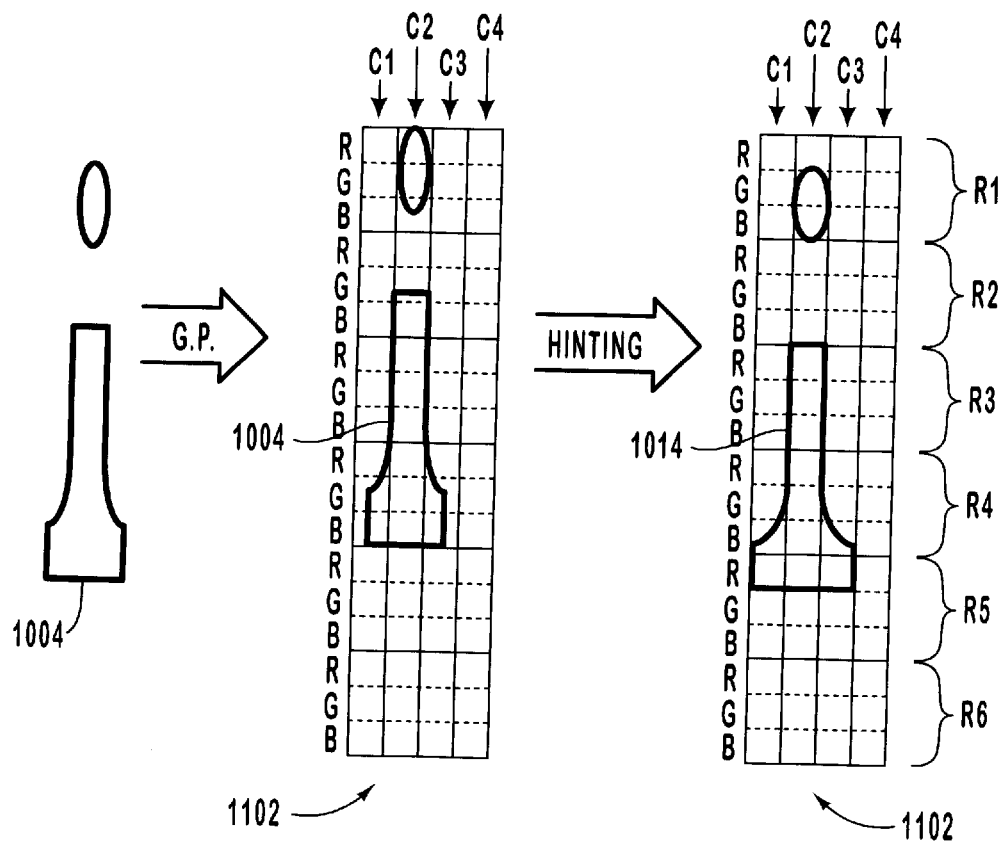
FIGS. 11A and 11B illustrate hinting operations performed in accordance with various exemplary embodiments of the present invention.
Figure 11B:
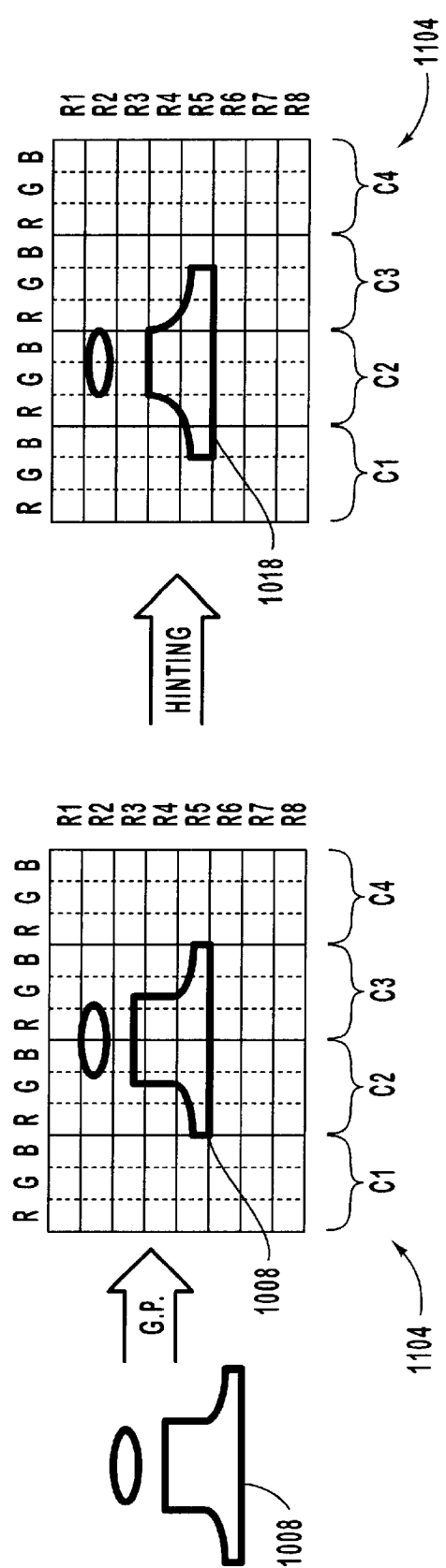

Hinting operations are illustrated in FIGS. 11A and 11B. FIG. 11A illustrates the hinting of the scaled character 1004 which is intended to be displayed on a monitor with horizontal striping. FIG. 11B illustrates the hinting of the scaled character 1008 which is intended to be displayed on a monitor with vertical striping.

Hinting involves the alignment of a scaled character, e.g., the character 1004, 1008 within a grid 1102, 1104 that is used as part of a subsequent scan conversion operation. It also involves the distorting of image outlines so that the image better conforms to the shape of the grid. The grid is determined as a function of the physical size of a display device's pixel elements.

Unlike the prior art which failed to take into consideration pixel sub-component boundaries during hinting, the present invention treats pixel sub-component boundaries as boundaries along which characters can and should be aligned or boundaries to which the outline of a character should be adjusted.

The hinting process of the present invention involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or pixel sub-component boundary and aligning the bottom of the character's base along a pixel component or sub-component boundary.

Experimental results have shown that in the case of vertical striping, characters with stems aligned so that the character stem has a blue or green left edge generally tend to be more legible than characters with stems aligned to have a red left edge. Accordingly, in at least some embodiments, during hinting of characters to be displayed on a screen with vertical striping, blue or green left edges for stems are favored over red left edges as part of the hinting process.

In the case of horizontal striping, characters aligned so that the bottom of the character base has a red or blue bottom edge generally tend to be more legible than characters with bases aligned to have a green bottom edge. Accordingly, during hinting of characters to be displayed on a screen with horizontal striping, in at least some embodiments, red or blue bottom edges are favored over green bottom edges as part of the hinting process.

FIG. 11A illustrates the application of a hinting operation to the scaled image 1104. As part of the hinting process, the scaled image 1104 is placed on a grid 1102 and its position and outline are adjusted to better conform to the grid shape and to achieve a desired degree of character spacing. The letters "G.P." in FIGS. 11A and 11B indicate the grid placement step while the term hinting is used to indicate the outline adjustment and character spacing portions of the hinting process.

Note that in FIG. 11A where the image 1004 is hinted for display on a screen having horizontal striping, the scaled image 1004 is positioned along the R/G pixel sub-component boundary so that the base of the character 1004 has a red bottom edge. In addition, the image's outline is adjusted so that rectangular portions of the image adjoin pixel sub-component boundaries. This results in the hinted image 1014. The distance between the character image and left and right side bearing points (not shown) used for determining character position and spacing on the screen are also adjusted as a function of pixel sub-component boundaries. Thus, in various embodiments of the present invention, character spacing is controlled to a distance corresponding to the width of a pixel sub-component, e.g., ⅓ of a pixel width.

In FIG. 11B where the image 1008 is hinted for display on a screen having vertical striping, the scaled image 1008 is positioned along the R/G pixel sub-component boundary so that the left edge of the stem of the hinted character 1018 has a green left edge. The shape of the character is also adjusted as well as the position of the character on the grid. Character spacing adjustments are also made.

Once the hinting process is completed in step 912, operation proceeds to step 914 wherein a scan conversion operation is performed in accordance with the present invention, e.g., by executing the scan conversion sub-routine 812.

Figure 2C:
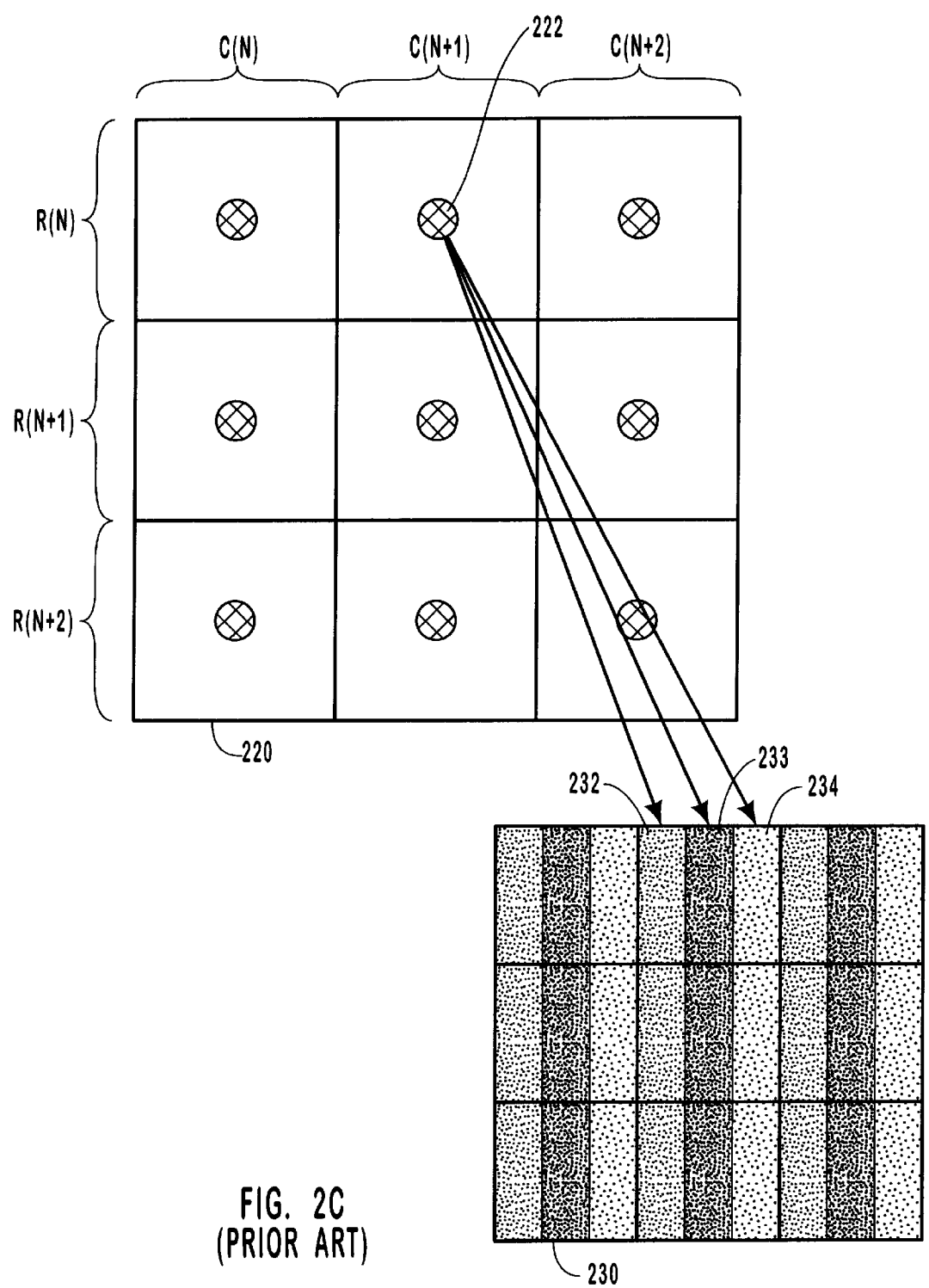
FIG. 2C illustrates an image sampling operation performed in known systems.

Scan conversion involves the conversion of the scaled geometry representing a character into a bitmap image. Conventional scan conversion operations treat pixels as individual units into which a corresponding portion of the scaled image can be mapped. Accordingly, in the case of conventional scan conversion operations, the same portion of an image is used to determine the luminous intensity values to be used with each of the RGB pixel sub-components of a pixel element into which a portion of the scaled image is mapped. FIG. 2C is exemplary of a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a separate portion of the scaled image can be mapped. Thus, the present invention allows different portions of a scaled image to be mapped into different pixel sub-components providing for a higher degree of resolution than is possible with the known scan conversion techniques. That is, in various embodiments, different portions of the scaled image are used to independently determine the luminous intensity values to be used with each pixel sub-component.

Figure 6:
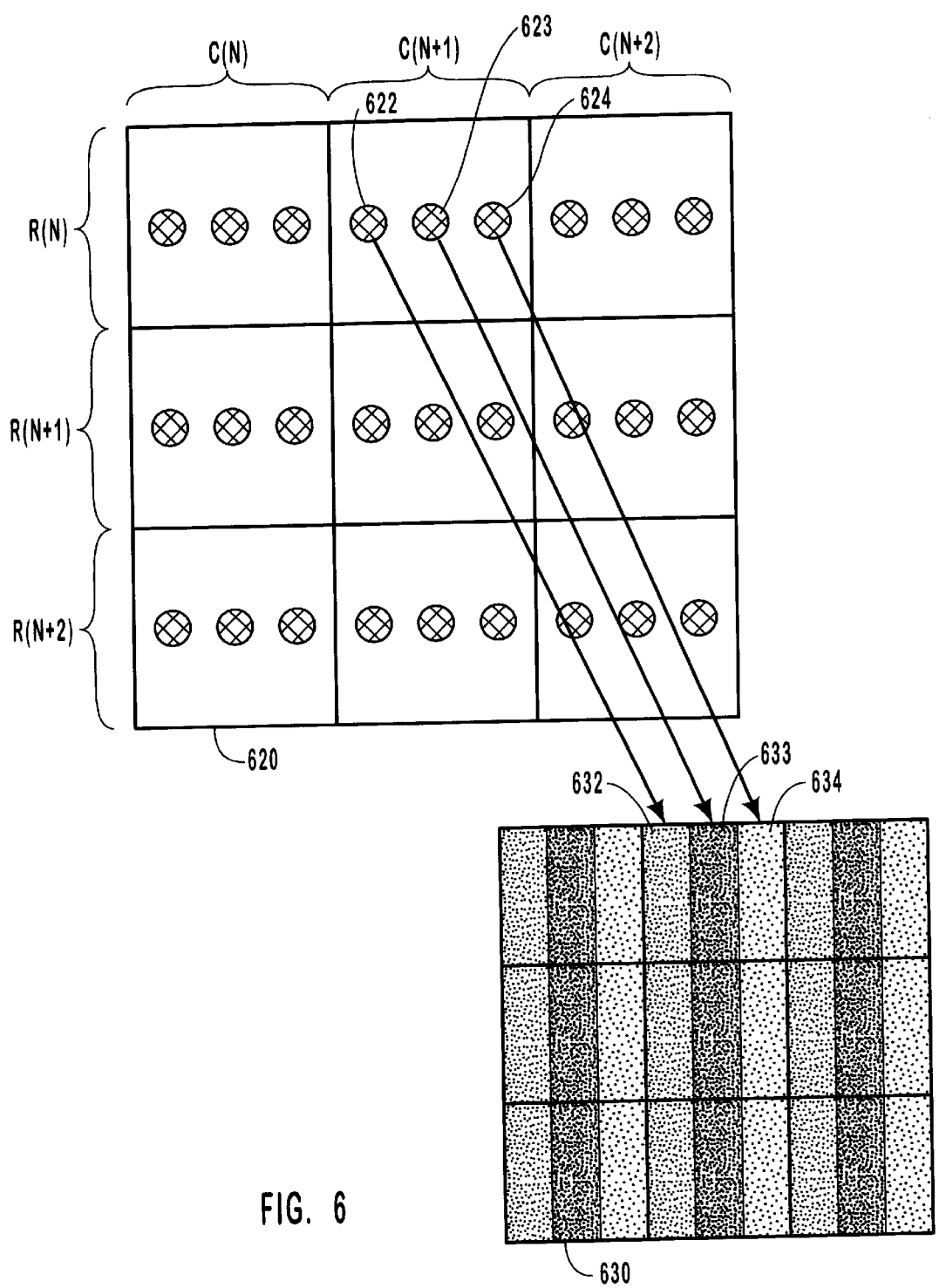
FIG. 6 illustrates image sampling performed in accordance with one exemplary embodiment of the present invention.

FIG. 6 illustrates an exemplary scan conversion implemented in accordance with one embodiment of the present invention. In the illustrated embodiment, separate image samples 622, 623, 624 of the image represented by the grid 620 are used to generate the red, green and blue intensity values associated with corresponding portions 632, 633, 634 of the bitmap image 630 being generated. In the FIG. 6 example, image samples for red and blue are displaced −⅓ and +⅓ of a pixel width in distance from the green sample, respectively. Thus, the displacement problem encountered with the known sampling/image representation method illustrated in FIG. 2C is avoided.

In the examples illustrated in the figures, white is used to indicate pixel sub-components which are "turned on" in the bitmap image generated by the scan conversion operation. Pixel sub-components which are not white are "turned off".

In the case of black text "on" implies that the intensity value associated with the pixel sub-component is controlled so that the pixel sub-component does not output light. Assuming a white background pixel, sub-components which are not "on" would be assigned intensity values which would cause them to output their full light output.

In the case where foreground and background colors are used "on" means that a pixel sub-component is assigned a value which would produce the specified foreground color if all three pixel sub-components were used to generate the foreground color. Pixel sub-components which are not "on" are assigned values which would produce the specified background color if all three pixel sub-components were used to generate the background color.

A first technique for determining if a pixel sub-component should be turned "on" during scaling is to determine if the center of the scaled image segment, represented by a portion of the scaling grid, being mapped into the pixel sub-component is within the scaled representation of the image to be displayed. For example, in FIG. 12A, when the center of grid segment 1202 was inside the image 1004, the pixel sub-component C1, R5 would be turned on. Another technique is to determine if 50% or more of the scaled image segment being mapped into the pixel sub-component is occupied by the image to be displayed. If it is, then the pixel sub-component is turned "on". For example, when the scaled image segment represented by grid segment 1202 is occupied at least 50% by the image 1004, then the corresponding pixel sub-component C1, R5 is turned on. In the FIG. 12A, 12B, 13 and 14 examples which are discussed below, the first technique of determining when to turn a pixel sub-component on is employed.

Figure 12A:
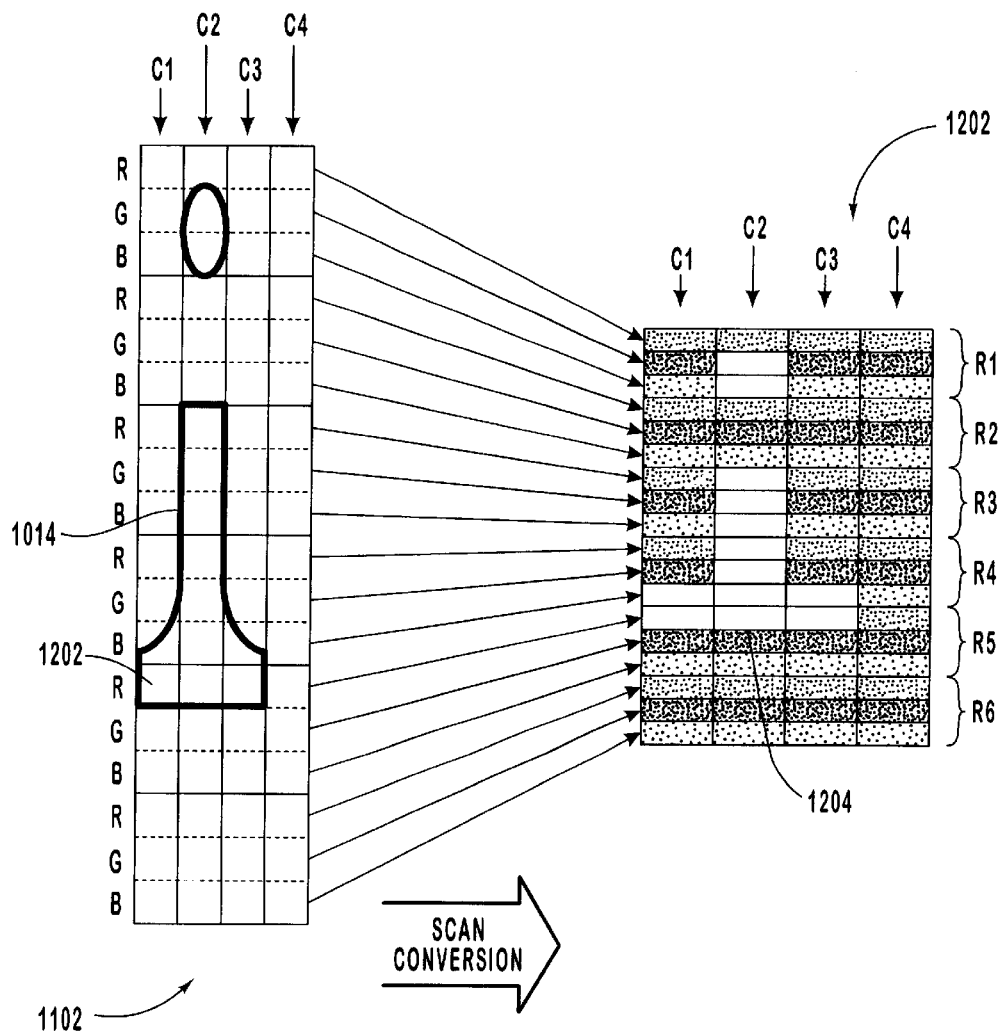
FIGS. 12A and 12B illustrate scan conversion operations performed in accordance with various exemplary embodiments of the present invention.

FIG. 12A illustrates a scan conversion operation performed on the hinted image 1014 for display on a display device with horizontal striping. The scan conversion operation results in the bitmap image 1202. Note how each pixel sub-component of bitmap image columns C1–C4 is determined from a different segment of the corresponding columns of the scaled hinted image 1014. Note also how the bitmap image 1204, comprises a ⅔ pixel height base aligned along a green/blue pixel boundary and a dot that is ⅔ of a pixel in height. Known text imaging techniques would have resulted in a less accurate image having a base a full pixel high and a dot which was a full pixel in size.

Figure 12B:
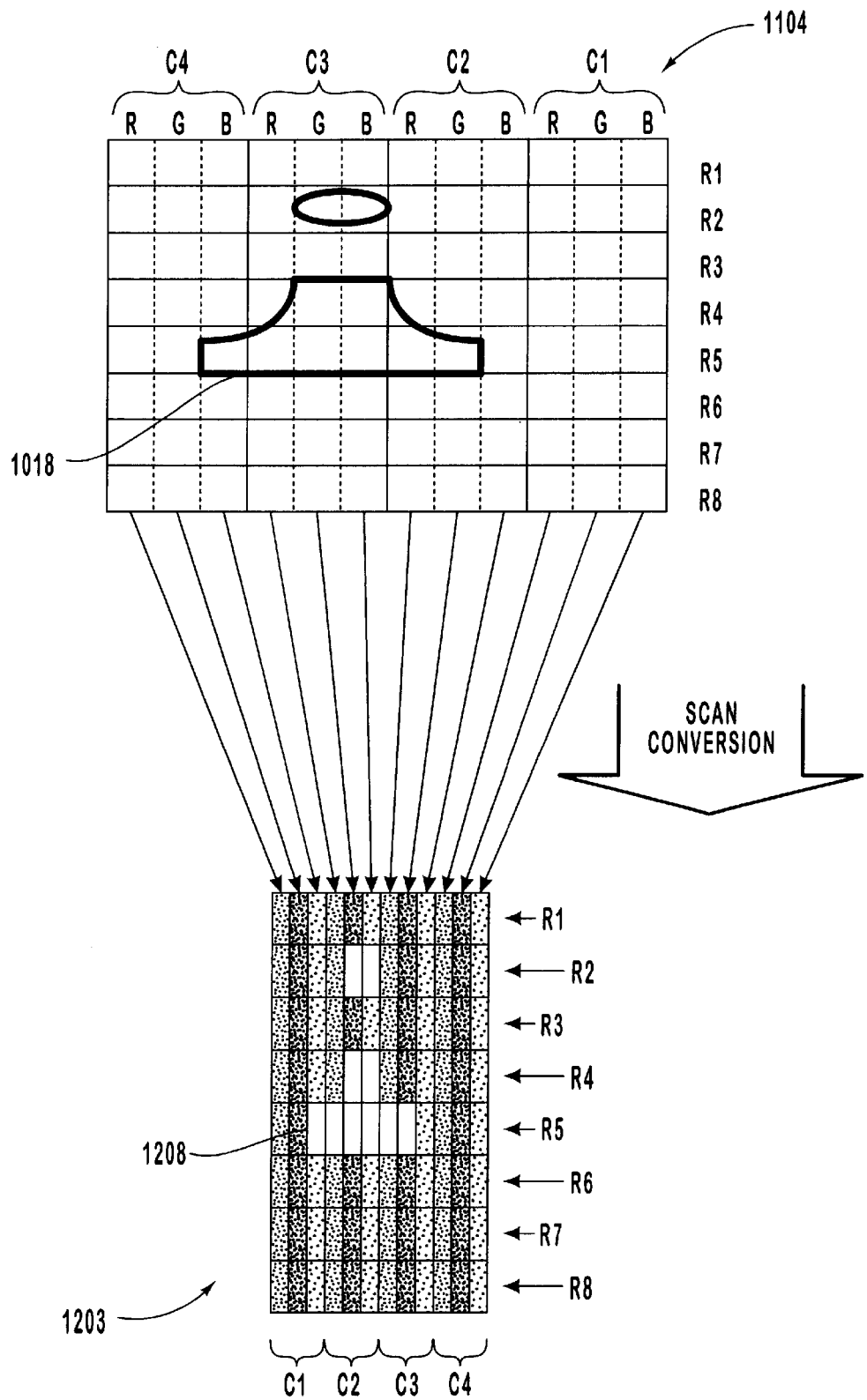

FIG. 12B illustrates a scan conversion operation performed on the hinted image 1018 for display on a display device with vertical striping. The scan conversion operation results in the bitmap image 1203. Note how each pixel sub-component of bitmap image Rows R1–R8 is determined from a different segment of the corresponding rows of the scaled hinted image, 1018. Note also how the bitmap image 1208, comprises a ⅔ pixel width stem with a left edge aligned along a red/green pixel boundary. Notice also that a dot that is ⅔ of a pixel in width is used. Known text imaging techniques would have resulted in a less accurate image having a stem a full pixel wide and a dot a full pixel in size.

Figure 13:
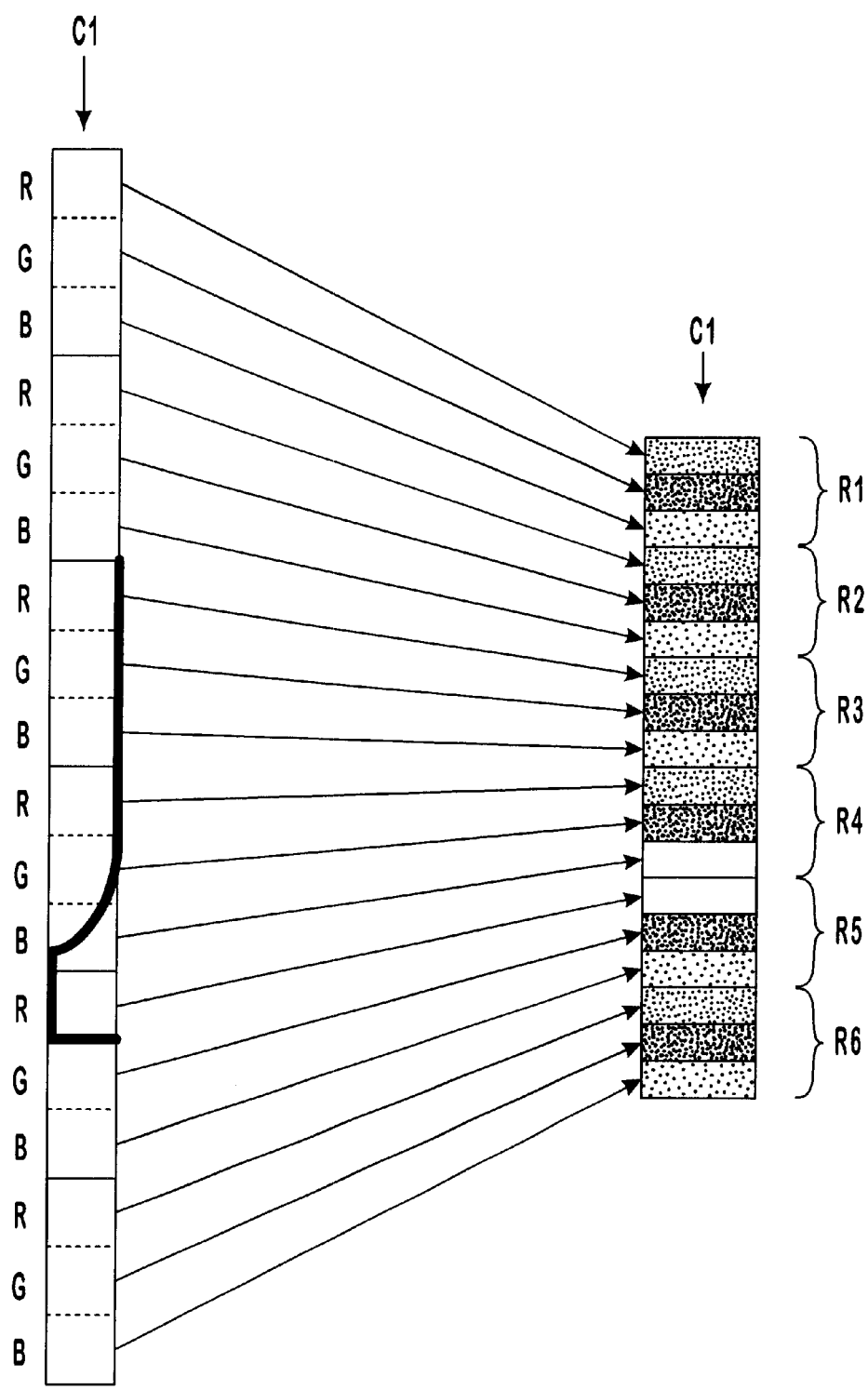
FIG. 13 illustrates the scan conversion process applied to the first column of image data illustrated in FIG. 12A in greater detail.

FIG. 13 illustrates the scan conversion processes performed to the first column of the scaled image, 1014, shown in FIG. 12A, in greater detail. In the illustrated scan conversion process, one segment of the scaled image, 1014 is used to control the luminous intensity value associated with each pixel sub-component. This results in each pixel sub-component being controlled by the same size portion of the scaled image 1014.

Weighting may be applied during the scan conversion operation. When weighting is applied, different size regions of the scaled image may be used to determine whether a particular pixel sub-component should be turned on or off or to a value in between (as in the case of gray scaling).

As discussed above, the human eye perceives light intensity from different color light sources at different rates. Green contributes approximately 60%, red approximately 30% and blue approximately 10% to the perceived luminance of a white pixel which results from having the red, green and blue pixel sub-components set to their maximum luminous intensity output.

In accordance with one embodiment of the present invention, weighting is used during scan conversion so that 60% of the scaled image area that is mapped into a pixel is used to determine the luminous intensity of the green pixel sub-component, a separate 30% of the scaled image area that is mapped into the same pixel is used to determine the luminous intensity of the red pixel sub-component, and a separate 10% of the scaled image area that is mapped into the same pixel is used to determine the luminous intensity of the blue pixel sub-component.

In one particular embodiment of the present invention, during the scaling operation, the image is scaled in the direction perpendicular to the striping at a rate which is ten times the rate of scaling in the direction of the striping. This is done to facilitate a weighted scan conversion operation. After hinting, the scaled image is then processed during scan conversion using a weighted scan conversion operation, e.g., of the type described above.

Figure 14:
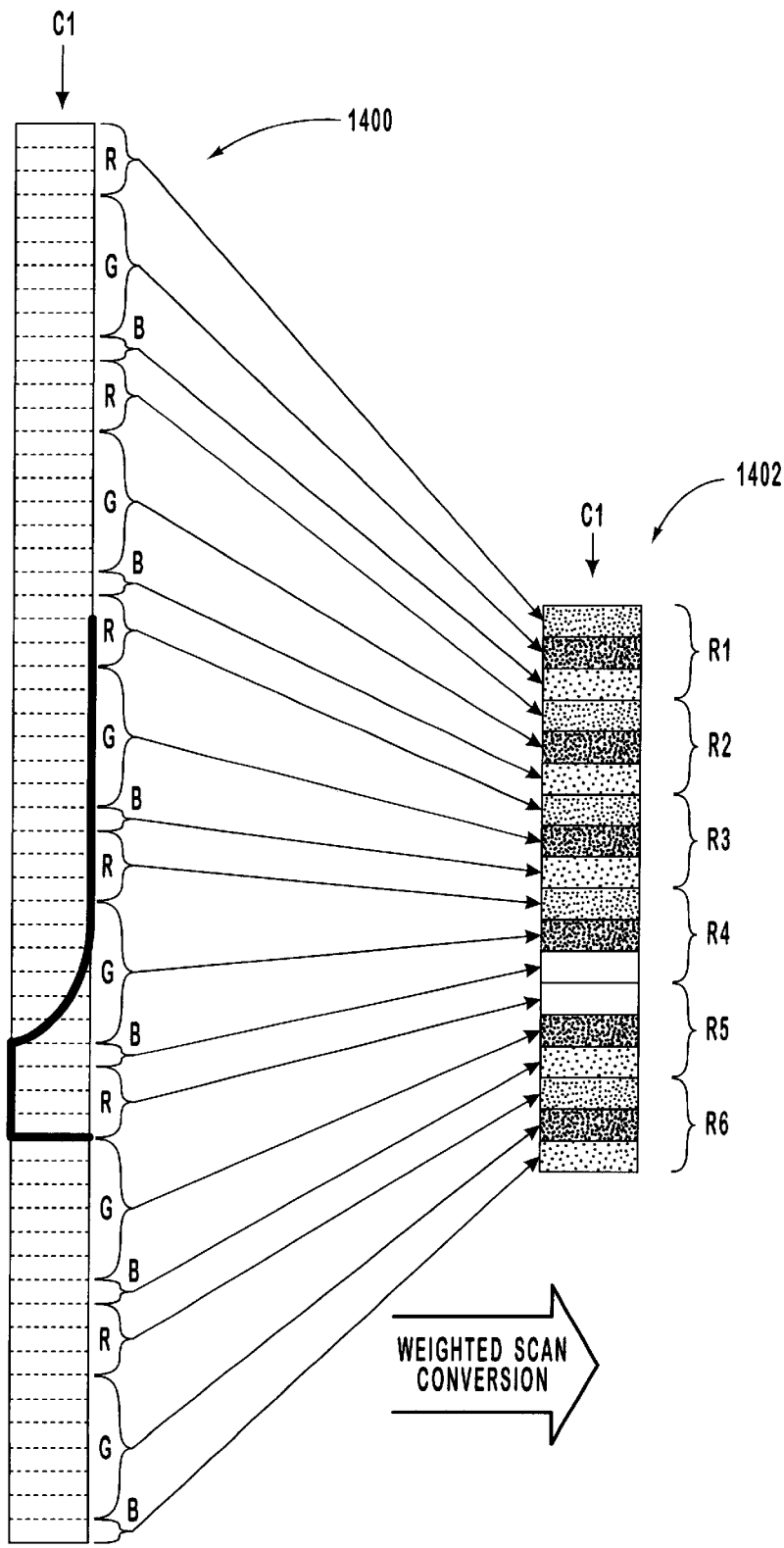
FIG. 14 illustrates a weighted scan conversion operation performed in accordance with one embodiment of the present invention.

FIG. 14 illustrates performing a weighted scan conversion operation on the first column 1400 of a scaled hinted version of the image 1002 which has been scaled by a factor of 10 in the vertical direction and a factor of one in the horizontal direction. In FIG. 14, the portion of the hinted image which corresponds to a single pixel comprises 10 segments. In accordance with the weighted scaling technique discussed above, the first three segments of each pixel area of the scaled image are used to determine the luminous intensity value of a red pixel sub-component corresponding to a pixel in the bitmap image 1402. The next six segments of each pixel area of the scaled image 1400 are used to determine the luminous intensity value of a green pixel sub-component corresponding to the same pixel in the bitmap image 1402. This leaves the last segment of each pixel area of the scaled image 1400 for use in determining the luminous intensity value of the blue pixel sub-component.

As illustrated in FIG. 14, this process results in the blue pixel sub-component being turned "on" in column 1, row 4 and the red pixel sub-component being turned "on" in column 1, row 5, of the bitmap image 1402 with the remaining pixel sub-components of column 1 being turned "off".

Generally, the scan conversion process of the present invention has been described in terms of turning a pixel sub-component "on" or "off".

Various embodiments of the present invention, particularly well suited for use with, e.g., graphics images, involve the use of gray scale techniques. In such embodiments, as with the embodiments discussed above, the scan conversion operation involves independently mapping portions of the scaled hinted image into corresponding pixel sub-components to form a bitmap image. However, in gray scale embodiments, the intensity value assigned to a pixel sub-component is determined as a function of the portion of the scaled image area being mapped into the pixel sub-component that is occupied by the scaled image to be displayed. For example, if, a pixel sub-component can be assigned an intensity value between 0 and 255, 0 being effectively off and 255 being full intensity, a scaled image segment (grid segment) that was 50% occupied by the image to be displayed would result in a pixel sub-component being assigned an intensity value of 127 as a result of mapping the scaled image segment into a corresponding pixel sub-component. In accordance with the present invention, the neighboring pixel sub-component of the same pixel would then have its intensity value independently determined as a function of another portion, e.g., segment, of the scaled image.

Once the bitmap representation of the text to be displayed is generated in step 914 of FIG. 9 it may be output to the display adapter or processed further to perform color processing operations and/or color adjustments to enhance image quality.

While the human eye is much more sensitive to luminance edges as opposed to image color (chrominance) edges, treating the RGB pixel sub-components as independent luminous intensity elements for purposes of image rendering can result in undesired color fringing effects. If, for instance, you remove red from an RGB set, a color fringing effect of cyan, the additive of green and blue, is likely to result.

In the FIG. 9 embodiment, the bitmap generated in step 914 is supplied to the color processing/adjustment step 915. In this step, image processing is performed to determine how far away from the desired foreground color the bitmap image has strayed. If portions of the bitmap image have strayed more than a pre-selected amount from the desired foreground color, adjustments in the intensity values of pixel sub-components are applied until the image portions are brought within an acceptable range of an average between the foreground and background colors.

In one exemplary embodiment, where vertical striping is used, image edges are checked for red fringing effects. These result from the red luminous intensity value of a pixel element being much higher than the green luminous intensity value for the same pixel element. Such a condition can produce a noticeable red color fringing effect on vertical stems of characters. In the exemplary embodiment, image edge pixels are individually examined. A red/green difference intensity value is determined and compared to a threshold value which is used to determine the need for a color adjustment. If the determined red/green difference intensity exceeds the threshold value, the red and/or green values are scaled to reduce the red fringing effect. Appropriate threshold and scaling values can be empirically determined.

Cyan color fringing effects, resulting from a low red luminous intensity value compared to the green and blue luminous intensity values may be detected and compensated for by using similar thresholding and luminous intensity scaling techniques to those discussed above with regard to compensating for red fringing effects.

Once color processing/adjustment has been performed in step 916, the processed bitmap 918 is output to the display adapter 814 and operation of the routines 807 is halted pending the receipt of additional data/images to be processed.

Figure 15:
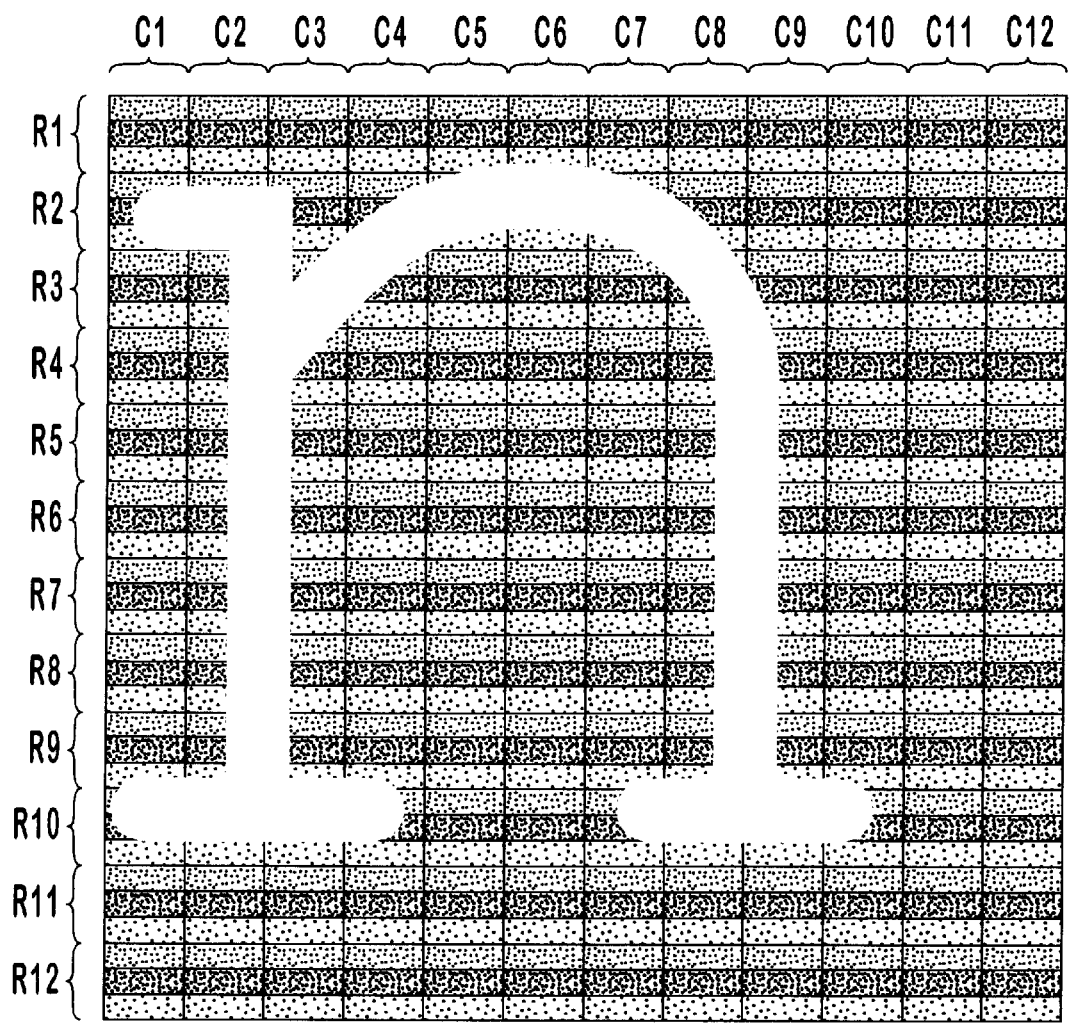
FIG. 15 illustrates a high resolution representation of a character to be displayed on a field of pixels.

FIG. 15 illustrates a high resolution representation of character n to be rendered superimposed on a grid representing an array of 12×12 pixels with horizontal striping.

Figure 16:
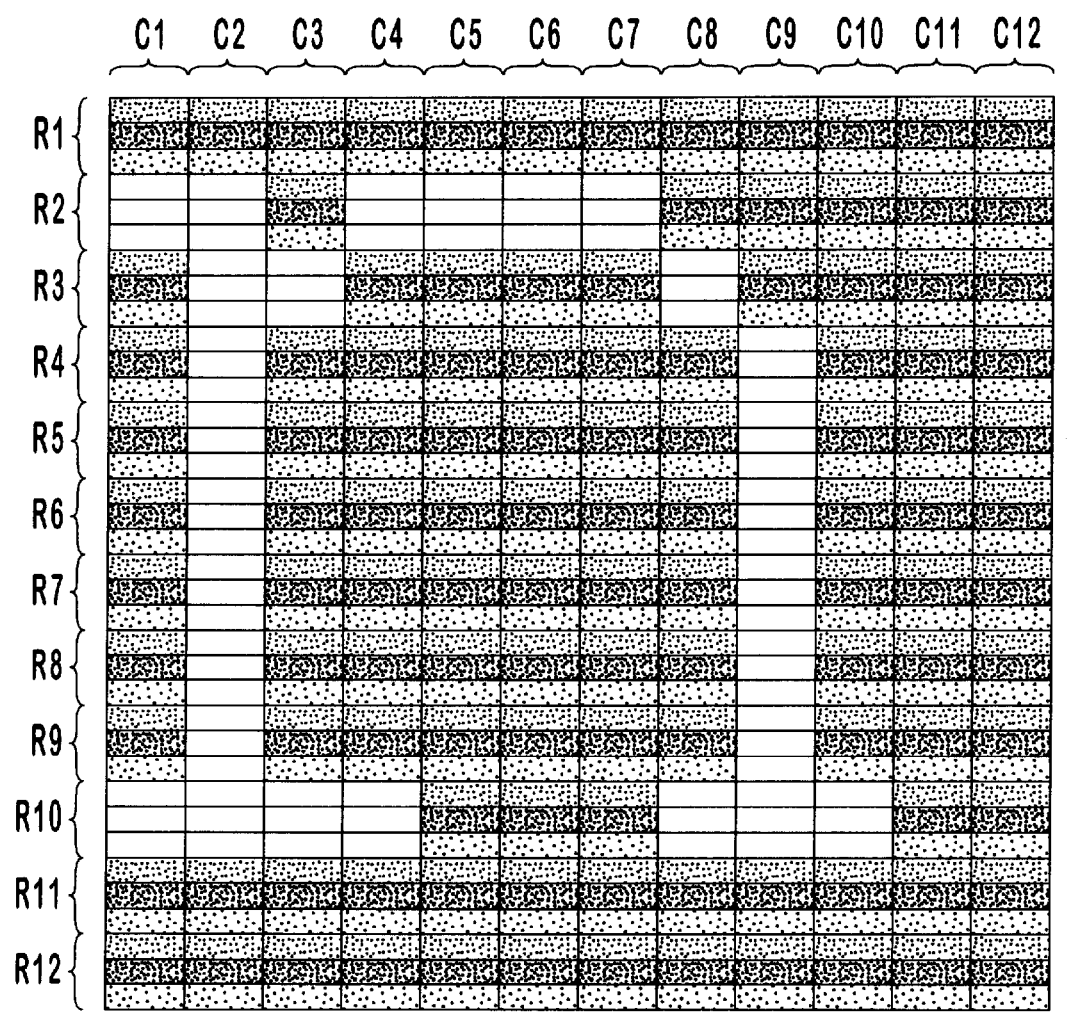

FIG. 16 illustrates how the character n illustrated in FIG. 15 would be rendered using conventional display techniques and full size pixel elements each including three pixel sub-components. Note how the full pixel size limitation results in relatively abrupt transitions in shape at the ridge of the letter resulting in aliasing and a relatively flat top portion.

Figure 17:
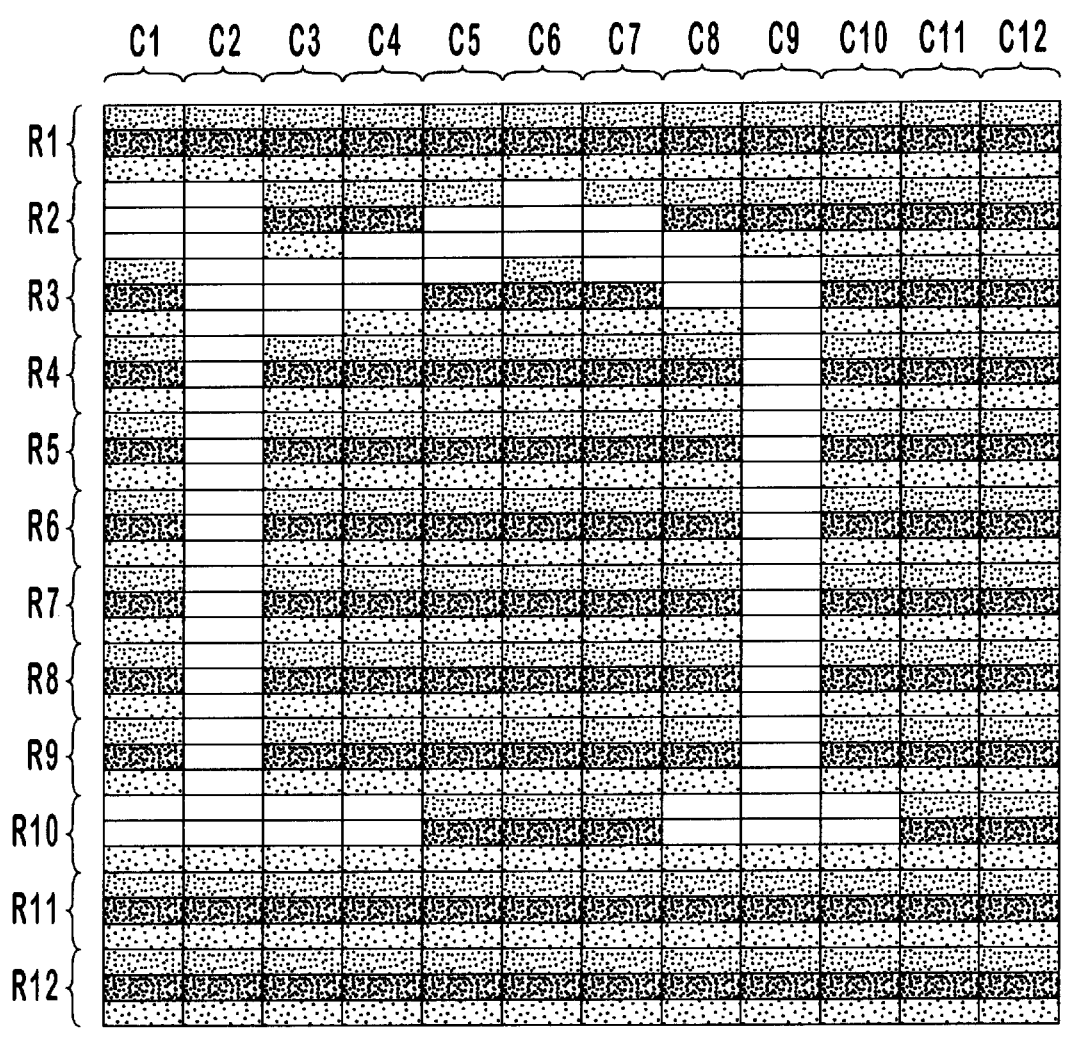

FIG. 17 illustrates how rendering of the letter n can be improved in accordance with the present invention by using a ⅔ pixel height base. The base is formed using 2 pixel sub-components as opposed to all three pixel sub-components in row 10, col. 1–4 and 8–10.

Note also how the ridge of the letter has been improved by providing a ridge a full pixel height in width but with each horizontal full height pixel element staggered by a ⅓ pixel height in the vertical direction making for a much more accurate and smoother ridge than that illustrated in FIG. 16.

Figure 18:
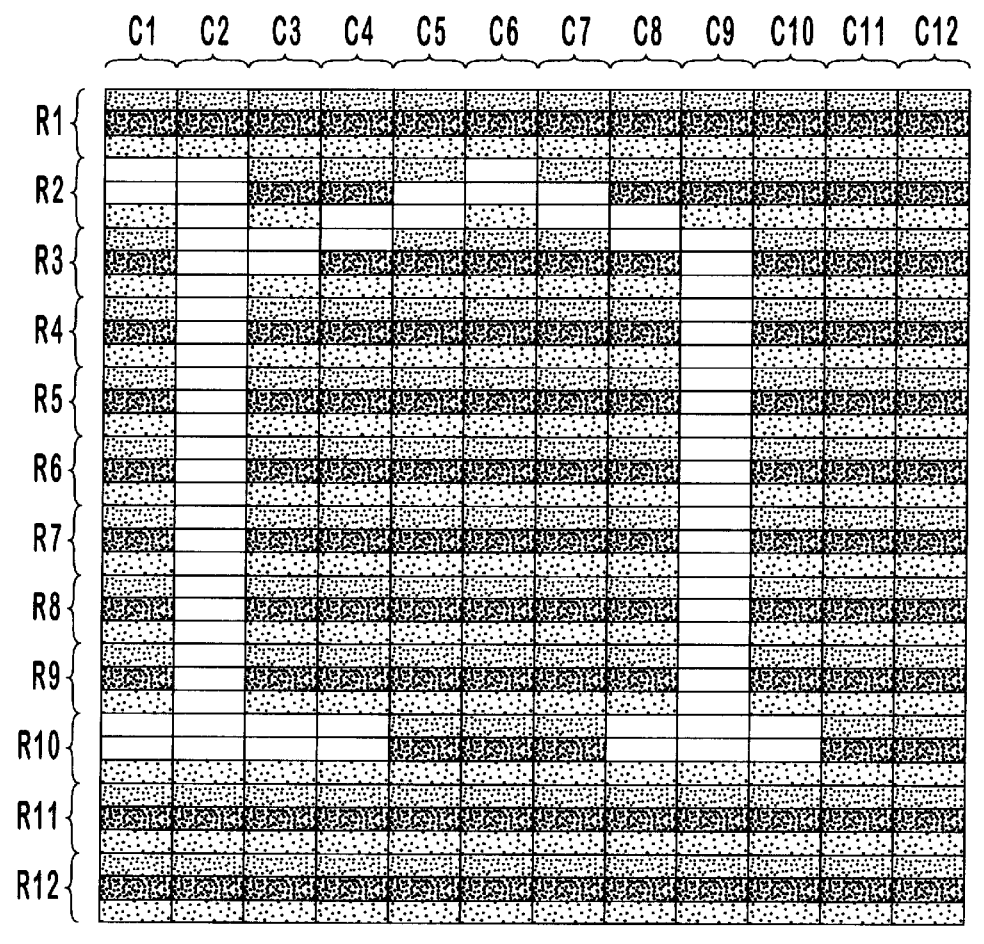

FIG. 18 illustrates how the ridge of the letter n can be reduced in thickness from one pixel in thickness to a ⅔ pixel thickness in accordance with the present invention.

Figure 19:
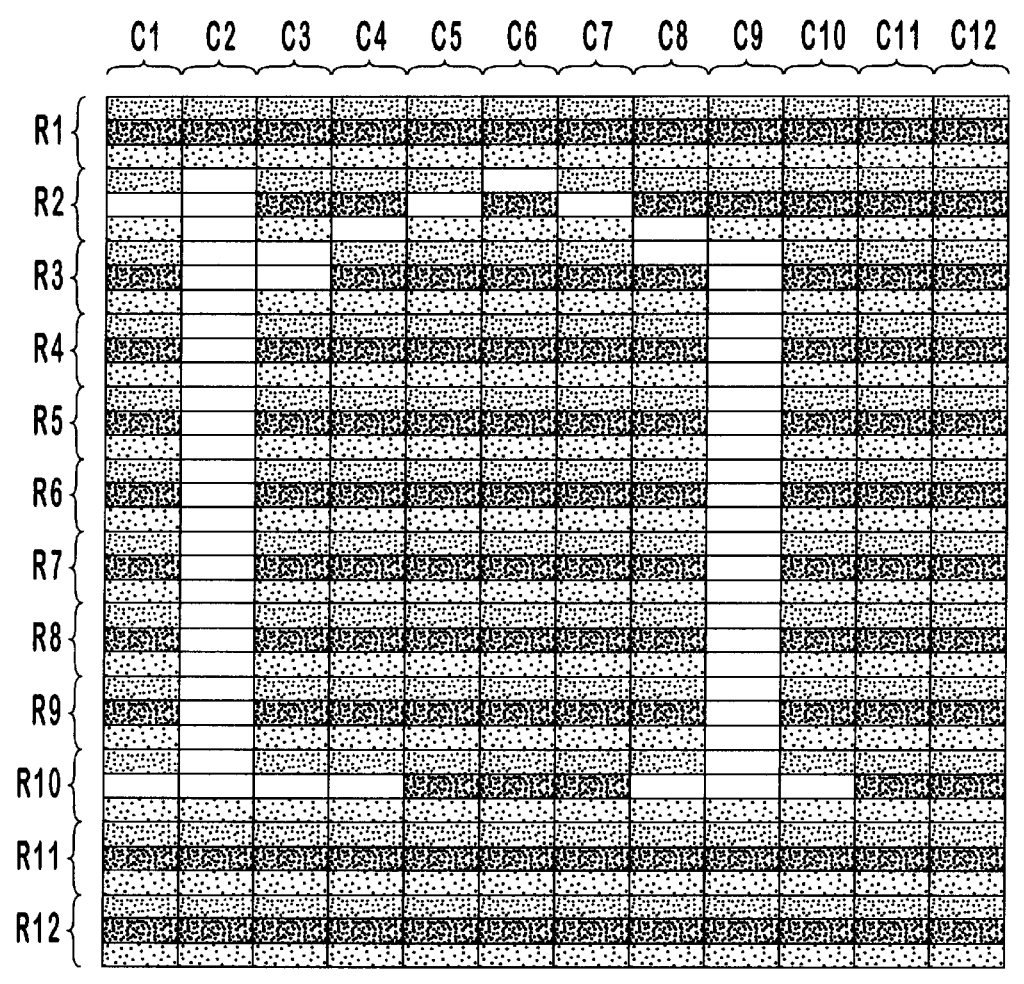

FIG. 19 illustrates how the base of the letter n can be reduced, in accordance with the present invention, to a minimal thickness of ⅓ that of a pixel. It also illustrates how portions of the ridge of the letter n can reduced to a thickness of ⅓ that of a pixel.

Figure 20:
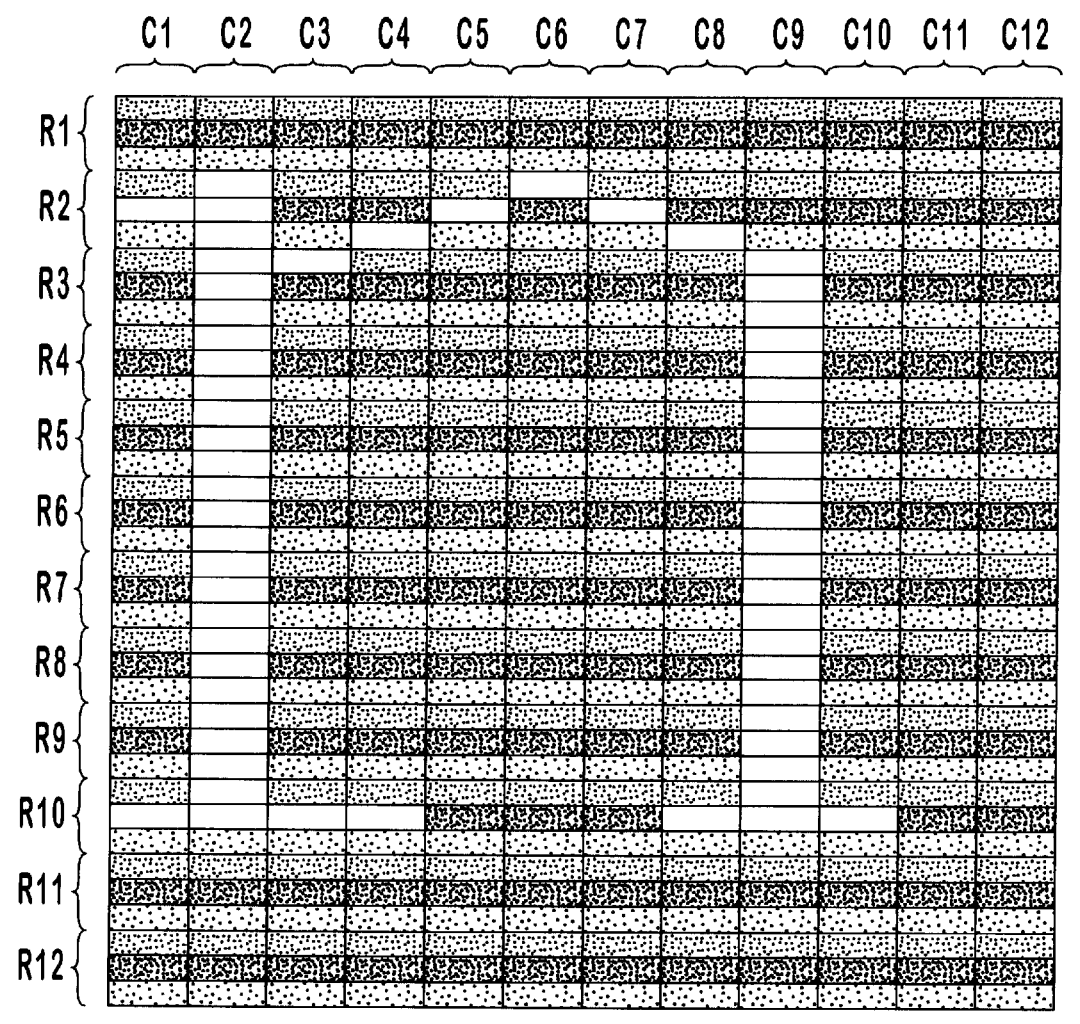

FIG. 20 illustrates how the letter n can be illustrated, in accordance with the present invention, with a base and ridge having a thickness of ⅓ that of a pixel.

While the present invention has been described largely in the context of rendering text, it is to be understood that the present invention can be applied to graphics as well to reduce aliasing and increase the effective resolution that can be achieved using striped displays such as conventional color LCD displays. In addition, it is to be understood that many of the techniques of the present invention can be used to process bitmapped images, e.g., scanned images, to prepare them for display.

In addition, it is to be understood that the methods and apparatus of the present invention can be applied to gray-scale monitors which, instead of using distinct RGB pixel sub-components, use multiple non-square pixel sub-components, of the same color, to multiply the effective resolution in one dimension as compared to displays which use square pixel elements.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. In a computer system including a processing unit and a display device for displaying an image, the display device having a plurality of pixels each comprised of a plurality of pixel sub-components, and wherein the pixel sub-components of each pixel have a different color and wherein all same colored sub-pixel components are aligned so as to form a stripped display, a method of improving the resolution of image data displayed on the display device, the method comprising:

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

a step for performing a grid-fitting operation on the image data, the grid-fitting operation being performed as a function of pixel sub-component boundaries by aligning at least a portion of the image data with a pixel sub-component boundary of a grid representing locations of the pixel sub-components on the display device, the pixel sub-component boundary of the grid corresponding to a boundary on the display device between a first pixel sub-component and a second pixel sub-component irrespective of whether the first and second pixel subcomponents are contained within the same pixel; and a step for displaying the image data on the display device.

2. The method of claim 1, wherein said image data represents a character and wherein said display device includes red, green and blue pixel sub-components and wherein the step for performing the grid-fitting operation is comprised of the act of:

aligning a left edge of a stem of said character along a blue pixel sub-component boundary to provide the stem with a blue left edge.

3. The method of claim 2, wherein the blue pixel sub-component boundary corresponds to a location on the display device where adjacent green and blue pixel sub-components of the particular pixel adjoin each other.

4. The method of claim 2, wherein:

said image data includes an outline of a character and a bearing point associated with the character; and wherein the step for performing the grid-fitting operation further comprises the act of:

modifying the position of the bearing point so as to adjust the position of the outline of the character.

5. The method of claim 1, wherein said image data represents a character and wherein said display device includes red, green and blue pixel sub-components and wherein the step for performing the grid-fitting operation is comprised of the act of:

aligning a left edge of a stem of said character along a green pixel sub-component boundary to provide the stem with a green left edge.

6. The method of claim 5, wherein the green pixel sub-component boundary corresponds to a location on the display device where adjacent red and green pixel sub-components of the particular pixel adjoin each other.

7. The method of claim 5, wherein:

said image data includes an outline of a character and a bearing point associated with the character; and wherein the step for performing the grid-fitting operation further comprises the act of:

modifying the position of the bearing point so as to adjust the position of the outline of the character.

8. The method of claim 1, wherein said image data represents a character and wherein said display device includes red, green and blue pixel sub-components and wherein the step for performing the grid-fitting operation is comprised of the act of:

aligning a base of said character along a red pixel sub-component boundary to provide the base with a red bottom edge.

9. The method of claim 8, wherein the red pixel sub-component boundary corresponds to a location on the display device where adjacent red and green pixel sub-components of the particular pixel adjoin each other.

10. The method of claim 8, wherein:

said image data includes an outline of a character and a bearing point associated with the character; and wherein said step for performing the grid-fitting operation further comprises the act of:

modifying the position of the bearing point so as to adjust the position of the outline of the character.

11. The method of claim 1, wherein said image data represents a character and wherein said display device includes red, green and blue pixel sub-components and wherein the step for performing the grid-fitting operation is comprised of the act of:

aligning the base of said character along a blue pixel sub-component boundary to provide the base with a blue bottom edge.

12. The method of claim 11, wherein the blue pixel sub-component boundary corresponds to a location on the display device where adjacent blue and red pixel sub-components adjoin each other.

13. The method of claim 11, wherein:

said image data includes an outline of a character and a bearing point associated with the character; and wherein said step for performing the grid-fitting operation further comprises the act of:

modifying the position of the bearing point so as to adjust the position of the outline of the character.

14. The method of claim 1, wherein the image data includes a geometric representation of an outline of the image, and wherein said step for performing the grid-fitting operation further comprises the step for:

adjusting the outline of the image as a function of boundaries between the pixel sub-components.

15. The method of claim 14, wherein the step for adjusting the outline of the image comprises the act of adjusting a portion of the outline corresponding to a rectangular portion of the image to a width equal to an integer multiple of the width of N pixel sub-components.

16. The method of claim 15, wherein N is one.

17. The method of claim 15, wherein N is a value other than a multiple of 3.

18. In a computer system including a processing unit and a display device for displaying an image, the display device having a plurality of pixels each comprised of a plurality of pixel sub-components, and wherein the pixel sub-components of each pixel have a different color and wherein all same colored sub-pixel components are aligned so as to form a stripped display, a method of improving the resolution of image data displayed on the display device, the method comprising:

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

a step for performing a hinting operation on the image data as a function of the size of the pixel sub-components, the step for performing the hinting operation comprising:

a step for adjusting a dimension of the outline of the image data as a function of the size of a corresponding dimension of the pixel sub-components; and a step for aligning the outline of the image data with a pixel sub-component boundary of a grid, the grid representing locations of the pixels and the pixel sub-components on the display device; and a step for displaying the image data on the display device.

19. The method of claim 18, wherein one of the pixel sub-components has a width that is smaller than its length, and wherein the step for adjusting the dimension of the outline of the image comprises the act of:

adjusting the distance between two parallel portions of the outline to equal an integer multiple of said width of said one of the pixel sub-components.

20. The method of claim 19, wherein the integer multiple has a value less than 3.

21. The method of claim 19, wherein the integer multiple has a value greater than 3 and is not a multiple of 3.

22. The method of claim 18, wherein one of the pixel sub-components has a length that is smaller than its width, and wherein the step for adjusting the dimension of the outline of the image comprises the act of:
  adjusting the distance between two parallel portions of the outline to equal an integer multiple of said length of said one of the pixel sub-components.

23. The method of claim 22, wherein the integer multiple has a value less than 3.

24. The method of claim 22, wherein the integer multiple has a value greater than 3 and is not a multiple of 3.

25. In a computer system including a processing unit and a display device for displaying an image, the display device having a plurality of pixels each comprised of a plurality of pixel sub-components, and wherein the pixel sub-components of each pixel have a different color and wherein all same colored sub-pixel components are aligned so as to form a stripped display, a computer program product for implementing a method of improving the resolution of image data displayed on the display device, the computer program product comprising:
  a computer readable medium carrying computer executable instructions for implementing the method, and wherein the method is comprised of:
    a step for mapping samples of information representing an image to individual pixel sub-components of a pixel as opposed to mapping each of the samples to an entire pixel, each pixel sub-component having mapped thereto at least one spatially different sample;
    a step for generating a separate luminous intensity value for each pixel sub-component as opposed to each full pixel, the separate luminous intensity value for each sub-component being based on the at least one spatially different sample mapped thereto; and
    a step for performing a grid-fitting operation on the image data, the grid-fitting operation being performed as a function of pixel sub-component boundaries by aligning at least a portion of the image data with a pixel sub-component boundary of a grid representing locations of the pixel sub-components on the display device, the pixel sub-component boundary of the grid corresponding to a boundary on the display device between a first pixel sub-component and a second pixel sub-component irrespective of whether the first and second pixel sub-components are contained within the same pixel; and
    a step for displaying the image data on the display device.

26. The computer program product of claim 25, wherein the image data represents a character and wherein said display device includes red, green and blue pixel sub-components and wherein the step for performing said grid-fitting operation is comprised of the act of:
  aligning a left edge of a stem of said character along a blue pixel sub-component boundary to provide the stem with a blue left edge.

27. The computer program product of claim 25, wherein the image data represents a character and wherein said display device includes red, green and blue pixel sub-components and wherein the step for performing said grid-fitting operation is comprised of the act of:
  aligning a left edge of a stem of said character along a green pixel sub-component boundary to provide the stem with a green left edge.

28. The computer program product of claim 25, wherein the image data represents a character and wherein said display device includes red, green and blue pixel sub-components and wherein the step for performing said grid-fitting operation is comprised of the act of:
  aligning a base of said character along a red pixel sub-component boundary to provide the base with a red bottom edge.

29. The computer program product of claim 25, wherein the image data represents a character and wherein said display device includes red, green and blue pixel sub-components and wherein the step for performing said grid-fitting operation is comprised of the act of:
  aligning a base of said character along a blue pixel sub-component boundary to provide the base with a blue bottom edge.

30. A system capable of displaying an image, the system comprising:
  a display device for displaying the image, the display device having a plurality of pixels, each including a plurality of pixel sub-components, wherein each pixel sub-component of a particular pixel has a different color than other pixel sub-components of the particular pixel;
  a processing unit; and
  a readable medium carrying executable instructions that, when executed by the processing unit, enable the system to perform a method for displaying the image on the display device, the method comprising:
    a step for mapping samples of information representing an image to individual pixel sub-components of a pixel as opposed to mapping each of the samples to an entire pixel, each pixel sub-component having mapped thereto at least one spatially different sample;
    a step for generating a separate luminous intensity value for each pixel sub-component as opposed to each full pixel, the separate luminous intensity value for each sub-component being based on the at least one spatially different sample mapped thereto; and
    a step for performing a grid-fitting operation on the image data, the grid-fitting operation being performed as a function of pixel sub-component boundaries by aligning at least a portion of the image data with a pixel sub-component boundary of a grid representing locations of the pixel sub-components on the display device, the pixel sub-component boundary of the grid corresponding to a boundary on the display device between a first pixel sub-component and a second pixel sub-component irrespective of whether the first and second pixel sub components are contained within the same pixel; and
    a step for displaying the image data on the display device.

31. The system of claim 30, wherein the image data represents a character and wherein said display device includes red, green and blue pixel sub-components and wherein the step for performing said grid-fitting operation is comprised of the act of:
  aligning a left edge of a stem of said character along a blue pixel sub-component boundary to provide the stem with a blue left edge.

32. The system of claim 30, wherein the image data represents a character and wherein said display device includes red, green and blue pixel sub-components and wherein the step for performing said grid-fitting operation is comprised of the act of:
  aligning the left edge of a stem of said character along a green pixel sub-component boundary to provide the stem with a green left edge.

33. The system of claim 30, wherein the image data represents a character and wherein said display device includes red, green and blue pixel sub-components and wherein the step for performing said grid-fitting operation is comprised of the act of:

aligning a base of said character along a red pixel sub-component boundary to provide the base with a red bottom edge.

34. The system of claim 30, wherein the image data represents a character and wherein said display device includes red, green and blue pixel sub-components and wherein the step for performing said grid-fitting operation is comprised of the act of:

aligning a base of said character along a blue pixel sub-component boundary to provide the base with a blue bottom edge.

35. The system of claim 30, wherein the image data includes a geometric representation of an outline of the image, and where said step for performing the grid-fitting operation further comprises:

a step for adjusting the outline of said image as a function of boundaries between the pixel sub-component boundaries.

36. In a computer system including a processing unit and a display device for displaying a character, the display device having a plurality of pixels each comprised of a plurality of pixel sub-components, and wherein the pixel sub-components of each pixel have a different color and wherein all same colored sub-pixel components are aligned so as to form a stripped display, a method of improving the resolution of image data displayed on the display device, the method comprising:

a step for obtaining image data representing the character, the image data including an outline of the character;

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

an act of aligning a left edge of a stem of the character to a boundary on a grid representing locations of the pixel sub-components on the display device, the boundary of the grid corresponding to a boundary on the display device between a first pixel sub-component of a selected color of a particular pixel and a second pixel sub-component of the particular pixel; and an act of adjusting the width a the portion of the outline that represents a stem of the character so as to be equal to an integer multiple of the width of one of said plurality of pixel sub-components, the integer multiple not being a multiple of 3.

37. The method of claim 36, wherein said step for mapping samples of information comprises:

an act of mapping a first set of one or more of the samples to a first pixel sub-component; and an act of mapping a second set of one or more of the samples to second pixel sub-component and wherein the number of samples in the second set differs from the number of samples in the first set.

38. In a computer system including a processing unit and a display device for displaying a character, the display device having a plurality of pixels each comprised of a plurality of pixel sub-components, and wherein the pixel sub-components of each pixel have a different color and wherein all same colored sub-pixel components are aligned so as to form a stripped display, a method of improving the resolution of image data displayed on the display device, the method comprising:

a step for obtaining image data representing the character, the image data including an outline of the character;

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

a step for scaling the image data, wherein the image data is scaled in a horizontal direction more than it is scaled in a vertical direction;

a step for adjusting the position of an edge of the character so as to be aligned with a boundary between a first pixel sub-component and a second pixel sub-component; and a step for displaying the character on the display device, such that the edge of the character is rendered at the boundary between the first pixel sub-component and the second pixel sub-component.

39. The method of claim 38, wherein said step for mapping samples of the information individual pixel sub-components of the particular pixel as opposed to mapping the samples to the entire pixel, comprises a step for mapping more than one sample to each pixel sub-component.

40. In a computer system including a processing unit and a display device for displaying a character, the display device having a plurality of pixels each comprised of a plurality of pixel sub-components, and wherein the pixel sub-components of each pixel have a different color and wherein all same colored sub-pixel components are aligned so as to form a stripped display, a computer program product comprising a computer readable medium for carrying executable instructions for implementing a method of improving the resolution of image data displayed on the display device, and wherein the method comprises:

a step for obtaining image data representing the character, the image data including an outline of the character;

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

an act of aligning a left edge of a stem of the character to a boundary on a grid representing locations of the pixel sub-components on the display device, the boundary of the grid corresponding to a boundary on the display device between a first pixel sub-component of a selected color of a particular pixel and a second pixel sub-component of the particular pixel; and an act of adjusting the width a the portion of the outline that represents a stem of the character so as to be equal to an integer multiple of the width of one of said plurality of pixel sub-components, the integer multiple not being a multiple of 3.

41. The computer program product of claim 40, wherein said step for mapping samples of information comprises:

an act of mapping a first set of one or more of the samples to a first pixel sub-component; and an act of mapping a second set of one or more of the samples to second pixel sub-component and wherein the number of samples in the second set differs from the number of samples in the first set.

42. In a computer system including a processing unit and a display device for displaying a character, the display device having a plurality of pixels each comprised of a plurality of pixel sub-components, and wherein the pixel sub-components of each pixel have a different color and wherein all same colored sub-pixel components are aligned so as to form a stripped display, a computer program product comprising a computer readable medium for carrying executable instructions for implementing a method of improving the resolution of image data displayed on the display device, and wherein the method comprises:

a step for obtaining image data representing the character, the image data including an outline of the character;

a step for mapping samples of information representing an image to individual pixel sub-components of a pixel as opposed to mapping each of the samples to an entire pixel, each pixel sub-component having mapped thereto at least one spatially different sample;

a step for generating a separate luminous intensity value for each pixel sub-component as opposed to each full pixel, the separate luminous intensity value for each sub-component being based on the at least one spatially different sample mapped thereto;

a step for scaling the image data, wherein the image data is scaled in a horizontal direction more than it is scaled in a vertical direction;

a step for adjusting the position of an edge of the character so as to be aligned with a boundary between a first pixel sub-component and a second pixel sub-component; and a step for displaying the character on the display device, such that the edge of the character is rendered at the boundary between the first pixel sub-component and the second pixel sub-component.

43. The computer program product of claim 42, wherein said step for mapping samples of the information individual pixel sub-components of the particular pixel as opposed to mapping the samples to the entire pixel, comprises a step for mapping more than one sample to each pixel sub-component.

* * * * *

UNITED STATES PATENT AND TRADEMARK OFFICE
CERTIFICATE OF CORRECTION

PATENT NO. : 6,421,054 B1  Page 1 of 1
DATED : July 16, 2002
INVENTOR(S) : William Hill et al.

It is certified that error appears in the above-identified patent and that said Letters Patent is hereby corrected as shown below:

Column 5,
Line 66, before "are red" please insert -- on or --
Line 66, after "are" please insert -- within --

Column 18,
Line 4, after "the leter n can" please insert -- be --

Signed and Sealed this

Thirty-first Day of December, 2002

JAMES E. ROGAN
*Director of the United States Patent and Trademark Office*